(12) United States Patent
Klemm et al.

(10) Patent No.: US 7,658,239 B2
(45) Date of Patent: Feb. 9, 2010

(54) POWER TOOL, DRIVE ASSEMBLY, AND METHOD OF OPERATING THE SAME

(75) Inventors: Robert W. Klemm, Colgate, WI (US); Curtis J. Ladish, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 12/328,066

(22) Filed: Dec. 4, 2008

(65) Prior Publication Data

US 2009/0102407 A1 Apr. 23, 2009

Related U.S. Application Data

(62) Division of application No. 11/444,871, filed on Jun. 1, 2006, now Pat. No. 7,469,753.

(60) Provisional application No. 60/686,163, filed on Jun. 1, 2005.

(51) Int. Cl.
 *B25B 23/157* (2006.01)
(52) U.S. Cl. ............................ 173/178; 173/29; 173/48; 173/176; 81/473
(58) Field of Classification Search ................. 173/178, 173/48, 29, 176, 217, 216; 81/469, 473, 81/474, 475; 192/48.6, 56.1, 139, 223.2
 See application file for complete search history.

(56) References Cited

U.S. PATENT DOCUMENTS

| | | | |
|---|---|---|---|
| 1,832,123 | A | 11/1931 | Holland |
| 2,127,855 | A | 8/1938 | Baumgratz et al. |
| 2,566,183 | A | 8/1951 | Forss |
| 3,034,623 | A | 5/1962 | Amtsberg |
| 3,168,944 | A | 2/1965 | Livermont |
| 3,199,644 | A | 8/1965 | Clapp |
| 3,277,670 | A | 10/1966 | Bent |
| 3,354,754 | A | 11/1967 | Amtsberg et al. |

(Continued)

FOREIGN PATENT DOCUMENTS

DE 683190 11/1939

(Continued)

OTHER PUBLICATIONS

GB0610805.4 Search Report, 4 pages, Dated Sep. 28, 2006.

*Primary Examiner*—Scott A. Smith
(74) *Attorney, Agent, or Firm*—Michael Best & Friedrich LLP

(57) ABSTRACT

A power tool including a drive assembly including a first clutch assembly having an engaged configuration, in which the first clutch assembly transfers a drive force from a motor shaft to a spindle, and a disengaged configuration, in which the first clutch assembly prevents the transfer of the drive force. The first clutch assembly can be movable toward the disengaged configuration when a torque exerted on the spindle exceeds a torque limit. The drive assembly can also include a second clutch assembly having an engaged configuration, in which the second clutch assembly transmits the drive force from the motor shaft to the spindle, and a disengaged configuration, in which the second clutch assembly prevents the transmission of the drive force. The second clutch assembly can be movable toward the engaged configuration when the tool element engages a workpiece.

7 Claims, 21 Drawing Sheets

U.S. PATENT DOCUMENTS

| | | |
|---|---|---|
| 3,400,633 A | 9/1968 | Amtsberg et al. |
| 3,613,751 A | 10/1971 | Juhasz |
| RE27,550 E | 1/1973 | Bangerter |
| 3,739,659 A | 6/1973 | Workman, Jr. |
| 3,792,737 A | 2/1974 | Bratt |
| 3,834,252 A | 9/1974 | Abell et al. |
| 3,937,036 A | 2/1976 | Sauerwein |
| 4,113,080 A | 9/1978 | Thackston et al. |
| 4,154,308 A | 5/1979 | Goldsberry et al. |
| 4,208,555 A | 6/1980 | Ikeda et al. |
| 4,215,594 A | 8/1980 | Workman, Jr. et al. |
| 4,427,077 A | 1/1984 | Hall |
| RE31,755 E | 12/1984 | Wanner et al. |
| 4,485,682 A | 12/1984 | Stroezel et al. |
| 4,535,850 A | 8/1985 | Alexander |
| 4,791,833 A | 12/1988 | Sakai et al. |
| 4,836,349 A | 6/1989 | Sakamoto et al. |
| 4,844,177 A | 7/1989 | Robinson et al. |
| 4,869,131 A | 9/1989 | Ohmori |
| 4,880,064 A | 11/1989 | Willoughby et al. |
| 4,913,242 A | 4/1990 | Lo |
| 4,947,714 A | 8/1990 | Fluri |
| 5,005,682 A | 4/1991 | Young et al. |
| 5,025,903 A | 6/1991 | Elligson |
| 5,060,733 A | 10/1991 | Kress |
| 5,094,133 A | 3/1992 | Schreiber |
| 5,138,916 A | 8/1992 | Sato et al. |
| 5,238,461 A | 8/1993 | Gotman |
| 5,343,961 A | 9/1994 | Ichikawa |
| 5,356,350 A | 10/1994 | Schreiber |
| 5,372,206 A | 12/1994 | Sasaki et al. |
| 5,385,512 A | 1/1995 | Moolenaar et al. |
| 5,419,745 A | 5/1995 | Moolenaar et al. |
| 5,538,089 A | 7/1996 | Sanford |
| 5,540,629 A | 7/1996 | Gotman |
| 5,551,927 A | 9/1996 | Enzmann et al. |
| 5,568,849 A | 10/1996 | Sasaki et al. |
| 5,577,425 A | 11/1996 | Holmin et al. |
| 5,664,634 A | 9/1997 | McCracken |
| 5,673,758 A | 10/1997 | Sasaki et al. |
| 5,868,208 A | 2/1999 | Peisert et al. |
| 5,906,378 A | 5/1999 | Nordquist |
| 6,029,790 A | 2/2000 | Liu et al. |
| 6,045,303 A | 4/2000 | Chung |
| 6,062,114 A | 5/2000 | Rahm |
| 6,085,849 A | 7/2000 | Scigliuto |
| 6,088,933 A | 7/2000 | Mallalieu |
| 6,109,149 A | 8/2000 | Neumaier |
| 6,142,243 A | 11/2000 | Mayer |
| 6,173,792 B1 | 1/2001 | Hald |
| 6,176,162 B1 | 1/2001 | Ludwig et al. |
| 6,213,695 B1 | 4/2001 | Breitenmoser |
| 6,227,773 B1 | 5/2001 | Farney et al. |
| 6,244,358 B1 | 6/2001 | Beer et al. |
| 6,279,714 B1 | 8/2001 | Hsu |
| 6,311,787 B1 | 11/2001 | Berry et al. |
| 6,431,289 B1 | 8/2002 | Potter et al. |
| 6,497,316 B1 | 12/2002 | Hsu |
| 6,502,648 B2 | 1/2003 | Milbourne |
| 6,523,658 B2 | 2/2003 | Furuta et al. |
| 6,533,093 B2 | 3/2003 | Chen |
| 6,536,537 B1 | 3/2003 | Sasaki et al. |
| 6,550,546 B2 | 4/2003 | Thurler et al. |
| 6,568,298 B1 | 5/2003 | Zinck |
| 6,676,557 B2 | 1/2004 | Milbourne et al. |
| 6,702,090 B2 | 3/2004 | Nakamura et al. |
| 6,715,380 B2 | 4/2004 | Listl et al. |
| 6,722,667 B2 | 4/2004 | Cantlon |
| 6,739,225 B2 | 5/2004 | Bader et al. |
| 6,851,343 B2 | 2/2005 | Sasaki |
| 6,892,827 B2 | 5/2005 | Toyama et al. |
| 7,165,663 B2 | 1/2007 | Donner |
| 7,469,753 B2 * | 12/2008 | Klemm et al. .............. 173/178 |

FOREIGN PATENT DOCUMENTS

| | | |
|---|---|---|
| DE | 3315938 | 11/1984 |
| DE | 3432376 | 3/1986 |
| DE | 3919648 | 12/1990 |
| DE | 4038226 | 6/1992 |
| DE | 4333599 | 4/1994 |
| DE | 19719736 | 11/1997 |
| DE | 10006641 | 9/2000 |
| DE | 20010286 | 1/2001 |
| DE | 10308272 | 10/2003 |
| EP | 0281775 | 9/1988 |
| EP | 0302229 | 2/1989 |
| EP | 0320723 | 6/1989 |
| EP | 0498681 | 8/1992 |
| EP | 0525911 | 2/1993 |
| EP | 0666145 | 8/1995 |
| EP | 0988936 | 3/2000 |
| EP | 1066930 | 1/2001 |
| EP | 1258321 | 11/2002 |
| GB | 323035 | 12/1929 |
| GB | 720873 | 12/1954 |
| GB | 1152592 | 5/1969 |
| WO | 97/33721 | 9/1997 |
| WO | 99/16585 | 4/1999 |
| WO | 02/058883 | 8/2002 |
| WO | 02/059491 | 8/2002 |
| WO | 02/059500 | 8/2002 |

* cited by examiner

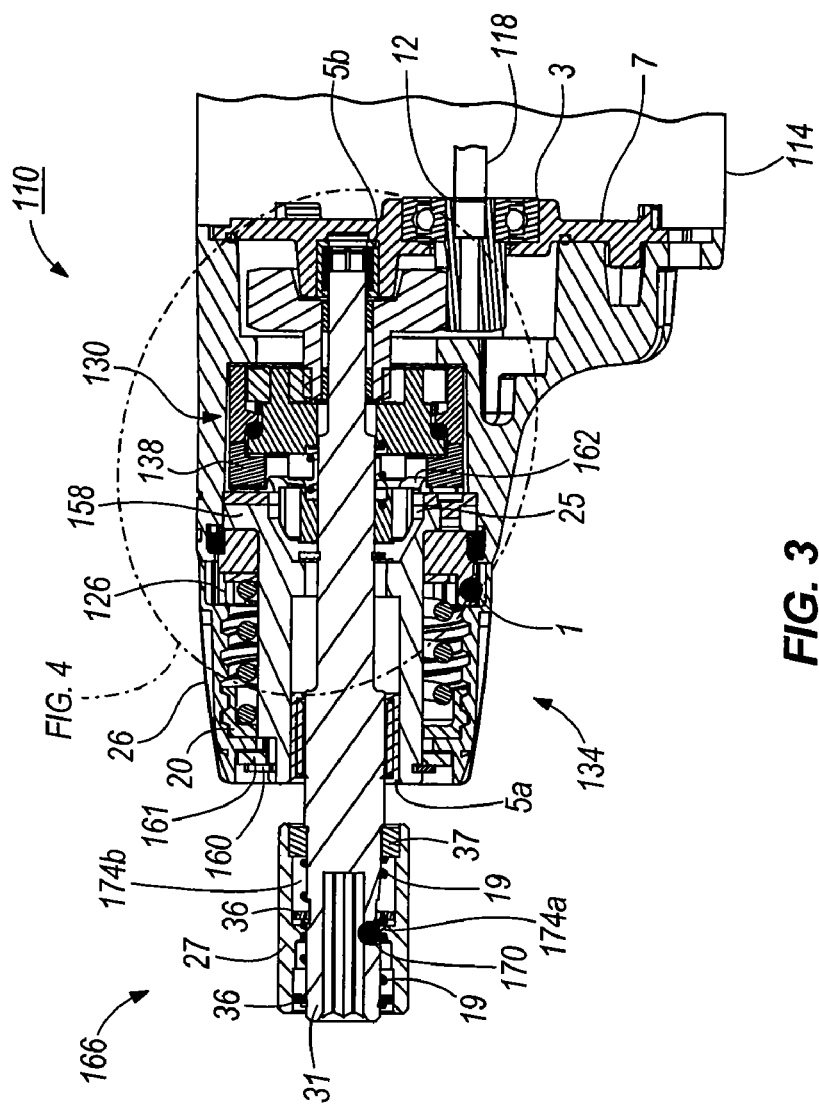

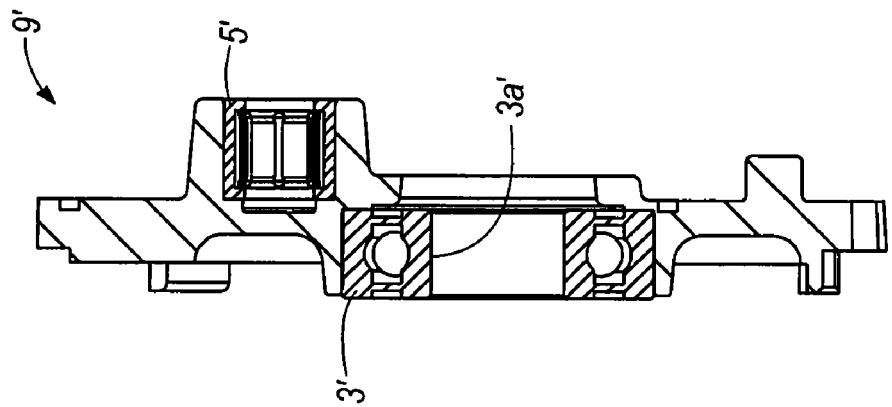
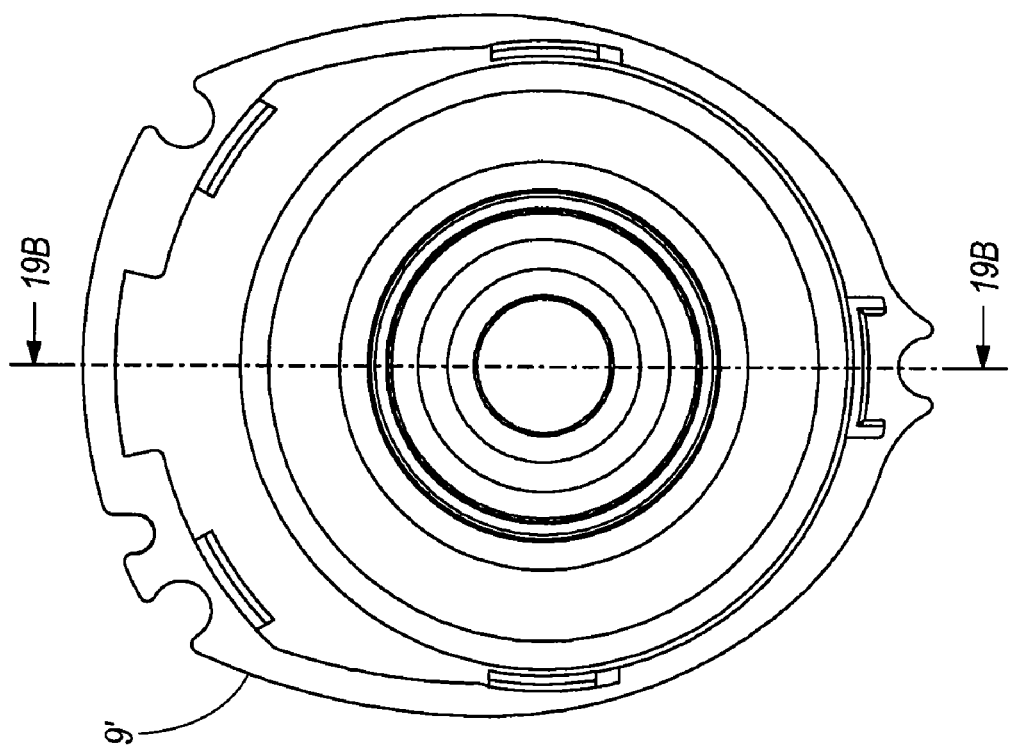

POWER TOOL, DRIVE ASSEMBLY, AND METHOD OF OPERATING THE SAME

CROSS-REFERENCE TO RELATED APPLICATION

This application is a divisional of Non-Provisional patent application Ser. No. 11/444,871 filed Jun. 1, 2006, now U.S. Pat. No. 7,469,753, which claims priority under 35 U.S.C. § 119 to Provisional patent application No. 60/686,163 filed on Jun. 1, 2005, the entire contents of which are hereby incorporated by reference.

FIELD OF THE INVENTION

The present invention relates generally to power tools and, more particularly, to a power tool, a drive assembly of a power tool, and a method of operating the same.

SUMMARY OF THE INVENTION

In some embodiments, the invention provides a power tool including a housing and a motor supported by the housing and including a motor shaft, a spindle supported by the housing for rotation about an axis, and a drive assembly provided between the spindle and the motor shaft such that the spindle is drivingly connectable to the motor shaft to drive a tool element. The drive assembly can include a first clutch assembly having an engaged configuration, in which the first clutch assembly transfers a drive force from the motor shaft to the spindle, and a disengaged configuration, in which the first clutch assembly prevents the transfer of the drive force from the motor shaft to the spindle. The first clutch assembly can be movable from the engaged configuration toward the disengaged configuration when a torque exerted on the spindle exceeds a torque limit. The drive assembly can also include a second clutch assembly having an engaged configuration, in which the second clutch assembly transmits the drive force from the motor shaft to the spindle, and a disengaged configuration, in which the second clutch assembly prevents the transmission of the drive force from the motor shaft to the spindle. The second clutch assembly can be movable from the disengaged configuration toward the engaged configuration when the tool element engages a workpiece.

In some embodiments, the invention provides a drive assembly for a power tool. The power tool can include a housing, a motor supported by the housing and having a motor shaft, and a spindle supported by the housing for rotation about an axis. The drive assembly can be provided between the spindle and the motor shaft such that the spindle is drivingly connectable to the motor shaft to drive a tool element. The drive assembly can include a drive member supported in the housing and a clutch member supported in the housing. The clutch member can be selectively engageable with the drive member to transfer a drive force from the motor shaft to the spindle when a torque exerted on the spindle is less than or equal to a torque limit and can be movable away from the drive member to prevent the transfer of the drive force from the motor shaft to the spindle when the torque exerted on the spindle exceeds the torque limit. The drive assembly can also include a first clutch plate secured to the spindle for movement with the spindle relative to the housing, and a second clutch plate supported in the housing and being engageable with the first clutch plate to transmit the drive force from the motor shaft to the spindle when the tool element engages a workpiece.

The present invention also provides a method of operating a power tool. The power tool can include a housing and a motor supported by the housing and including a motor shaft. The power tool can also include a spindle supported by the housing for rotation about an axis, and a drive assembly provided between the spindle and the motor shaft and including a first clutch assembly and a second clutch assembly. The method can include the acts of transferring a drive force from the motor shaft to the spindle to drive a tool element supported on the spindle, and applying a torque to the spindle that exceeds a torque limit and moving the first clutch assembly from an engaged configuration, in which the first clutch assembly transfers the drive force from the motor shaft to the spindle, toward a disengaged configuration, in which the first clutch assembly prevents the transfer of the drive force from the motor shaft to the spindle. The method can also include the act of engaging a workpiece with the tool element and moving the second clutch assembly from a disengaged configuration, in which the second clutch assembly prevents the transmission of the drive force from the motor shaft to the spindle, toward an engaged configuration, in which the second clutch assembly transmits the drive force from the motor shaft to the spindle.

One or more independent features and/or independent advantages of the present invention will become apparent to those skilled in the art upon review of the following detailed description and drawings.

BRIEF DESCRIPTION OF THE DRAWINGS

FIG. 2 is a front view of a portion of the power tool shown in FIG. 1A.

FIG. 3 is a cross-sectional side view of a portion of the power tool shown in FIG. 1A.

FIG. 19A is an enlarged rear view of the diaphragm shown in FIG. 17A.

FIG. 19B is a cross-sectional view of the diaphragm shown in FIG. 17A.

DETAILED DESCRIPTION

Figure 1A:
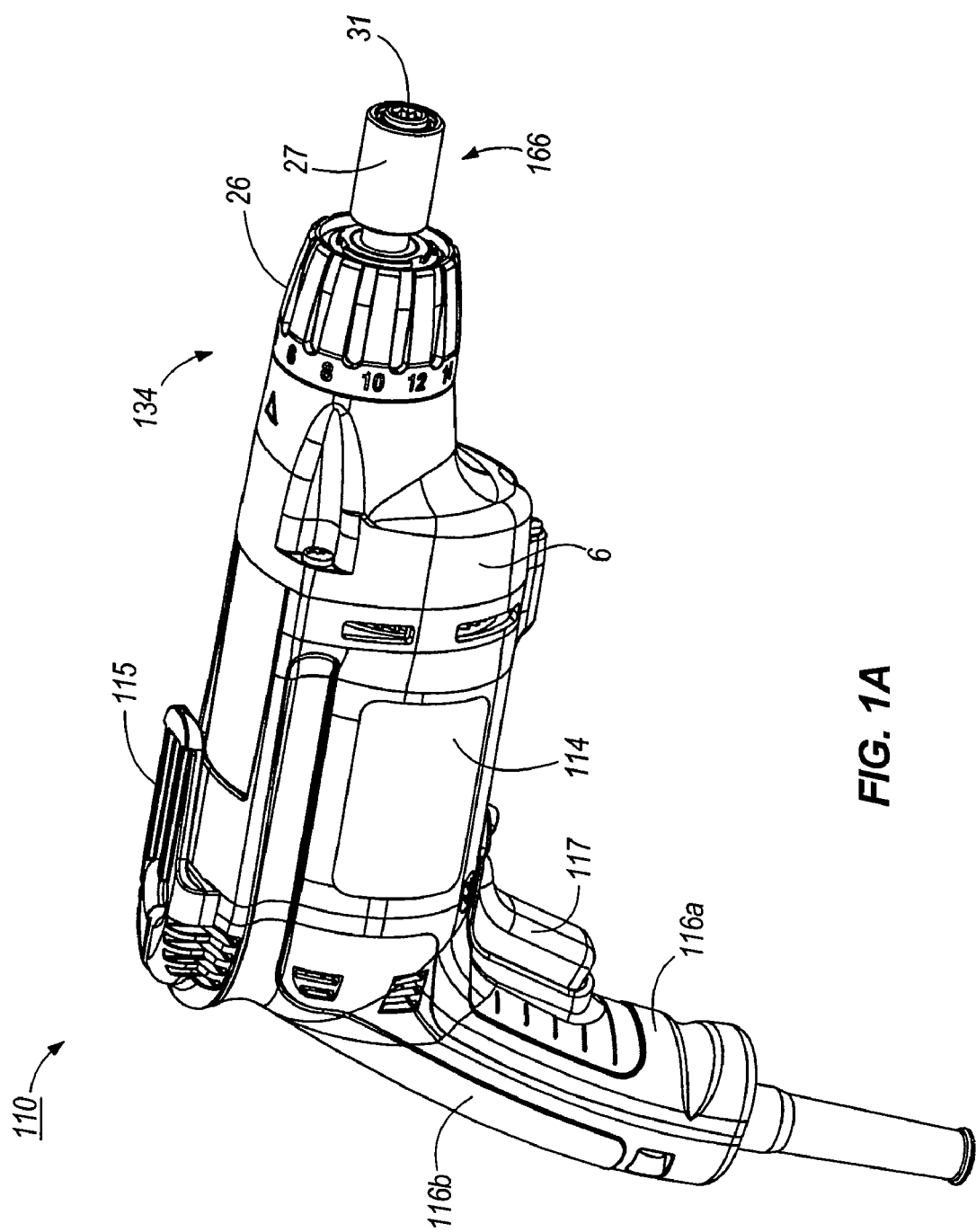
FIG. 1A is perspective view of a power tool.
Figure 1B:
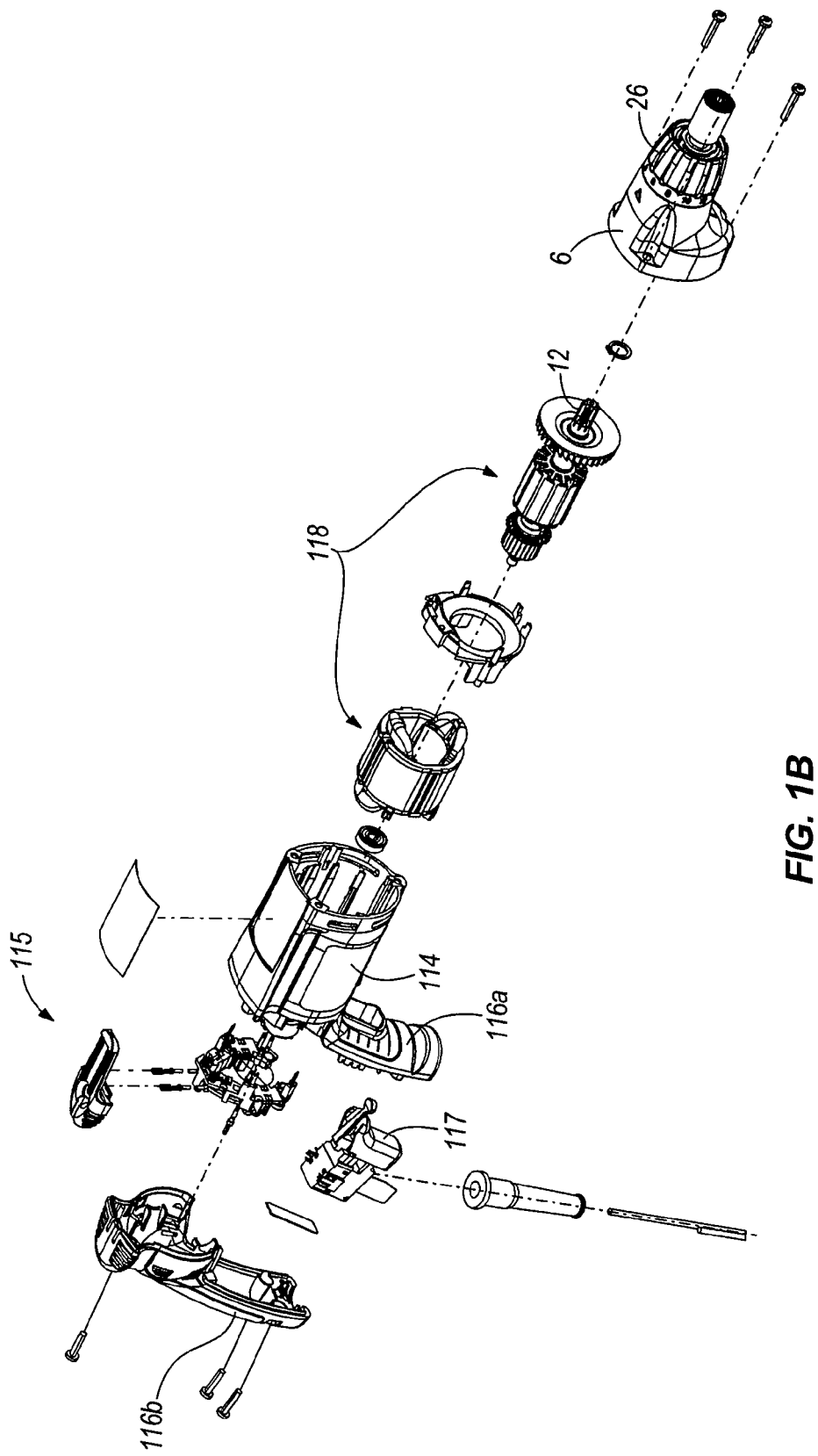
FIG. 1B is an exploded perspective view of the power tool shown in FIG. 1A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it is to be understood that phraseology and terminology used herein with reference to device or element orientation (such as, for example, terms like "front," "rear," "top," "bottom," "lower", "up," "down," etc.) are only used to simplify description of the present invention, and do not alone indicate or imply that the device or element referred to must have a particular orientation. The elements of the present invention can be installed and operated in any orientation desired. In addition, terms such as "first" and "second" are used herein for purposes of description and are not intended to indicate or imply relative importance or significance.

A power tool, such as, for example a drill, a screwdriver, etc. 110 and portions of the power tool are illustrated in FIGS. 1A-9. The power tool 110 may be a hard joint screwdriver, for example, for use in driving fasteners into steel or other metals.

The power tool 110 includes a housing 114 supporting a motor 118. The housing 114 provides a handle portion 116a, which receives a trigger 117 for operating the power tool 110. An additional handle portion 116b can be attachable to the housing 114 to form the rear end of the power tool 110 and a full hand grip for an operator. A belt clip 115 (shown in FIGS. 1A and 1B) can be releasably attached to the housing 114. A gear case 6 is connectable to the housing 114 to form a housing assembly.

The gear case 6 supports a drive assembly 126 which is selectively driven by the motor 118 and which is operable to rotate a spindle or output shaft 31 to drive a tool element, such as, for example, a bit (not shown). As shown in FIG. 3, a seal 5a and a needle bearing 5b may be provided at the forward end and rearward end of the output shaft 31, respectively. A retaining ring 14 can be held within a groove on the output shaft 31 to position the output shaft axially within the power tool 110. A collar washer 34 can be positioned adjacent the retaining ring 14. An additional collar washer 34 may be positioned adjacent the rearward end of the output shaft 31.

In some embodiments, the drive assembly 126 can include a planetary gear assembly 130. The gear assembly 130 generally includes a motor gear or drive gear 12 connected to the motor armature shaft. A bearing assembly such as a ball bearing 3 supports an end of the motor armature shaft. The drive gear 12 engages a dual central gear or sun gear 9 having an outer gear portion 9a and an inner gear portion 9b. A plurality of planet gears 10 (e.g., four planet gears 10) engage between the inner gear 9b and a ring gear assembly 11.

The ring gear assembly 11 may have an outer diameter which clears the inner diameter of the gear case 6. The ring gear assembly 11 may be self-centering on the sun gear 9 through the planet gears 10. Axial thrusts may be resisted by a flat rear face on the ring gear assembly 11.

Each planet gear 10 is rotatably supported by an idler clutch plate 22. On one side, the idler clutch plate 22 supports gear pins 22a each supporting a planet gear 10. Drive or clutch pins 22b are supported on the opposite side of the idler clutch plate 22.

In the illustrated embodiment, the power tool 110 includes a drive assembly 126 in which the axis of the output shaft 31 is offset from the axis of the motor armature shaft. This offset is provided while having a planetary gear assembly 130.

Figure 4:
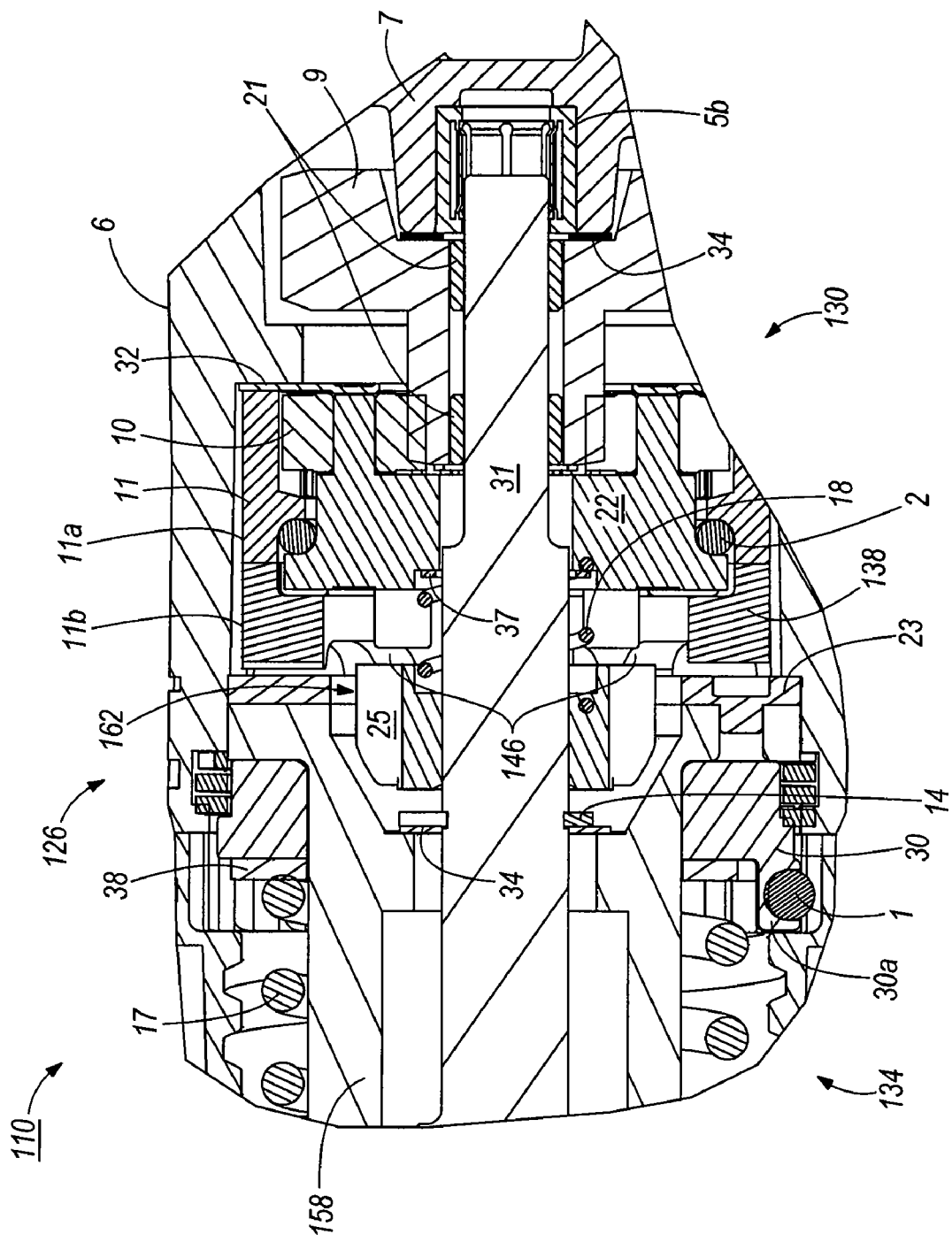
FIG. 4 is an enlarged cross-sectional side view of a portion of the power tool shown in FIG. 1A.
Figure 5:
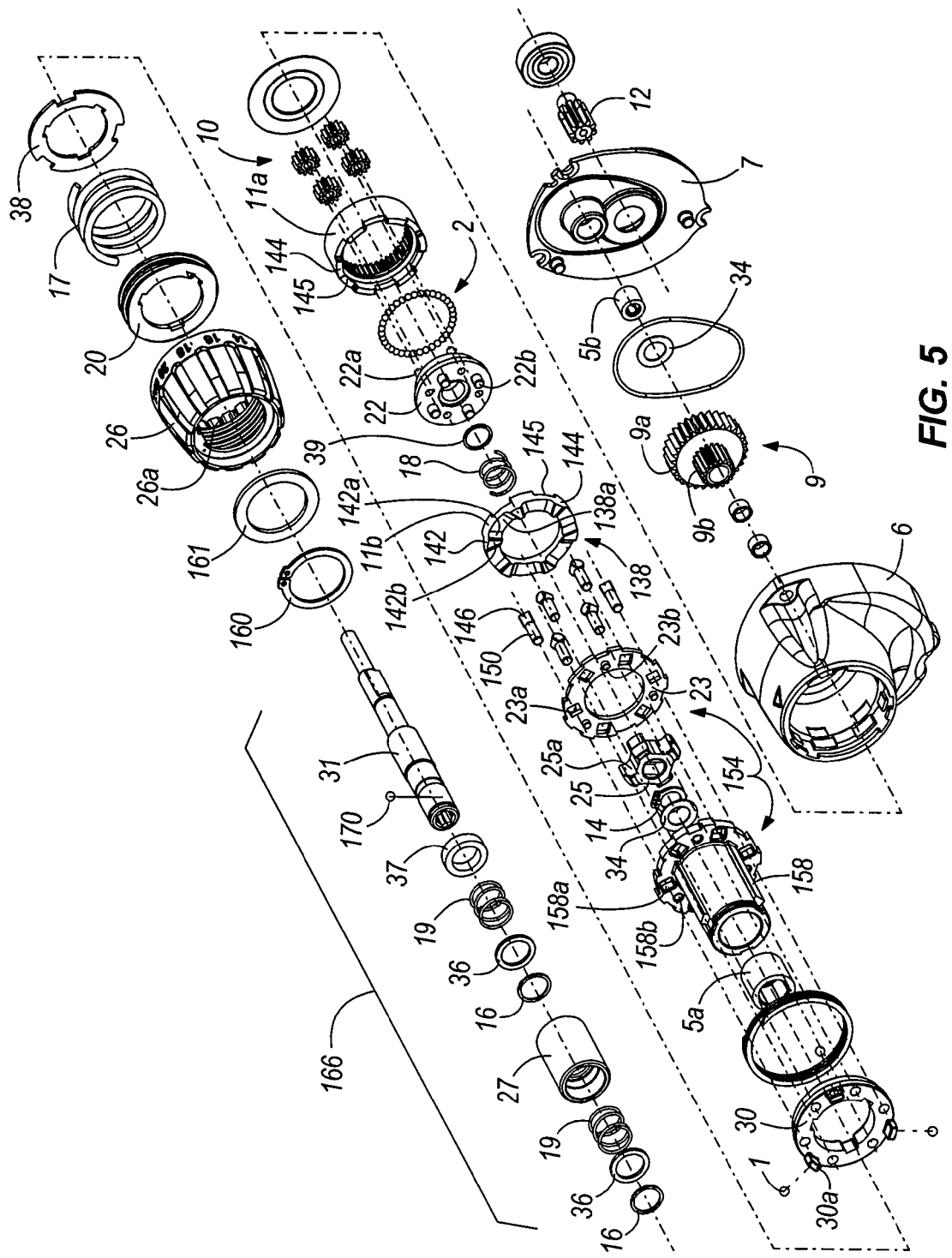
FIG. 5 is an exploded perspective view of a portion of the power tool shown in FIG. 1A.
Figures 6A, 6B, 6C, 6D:
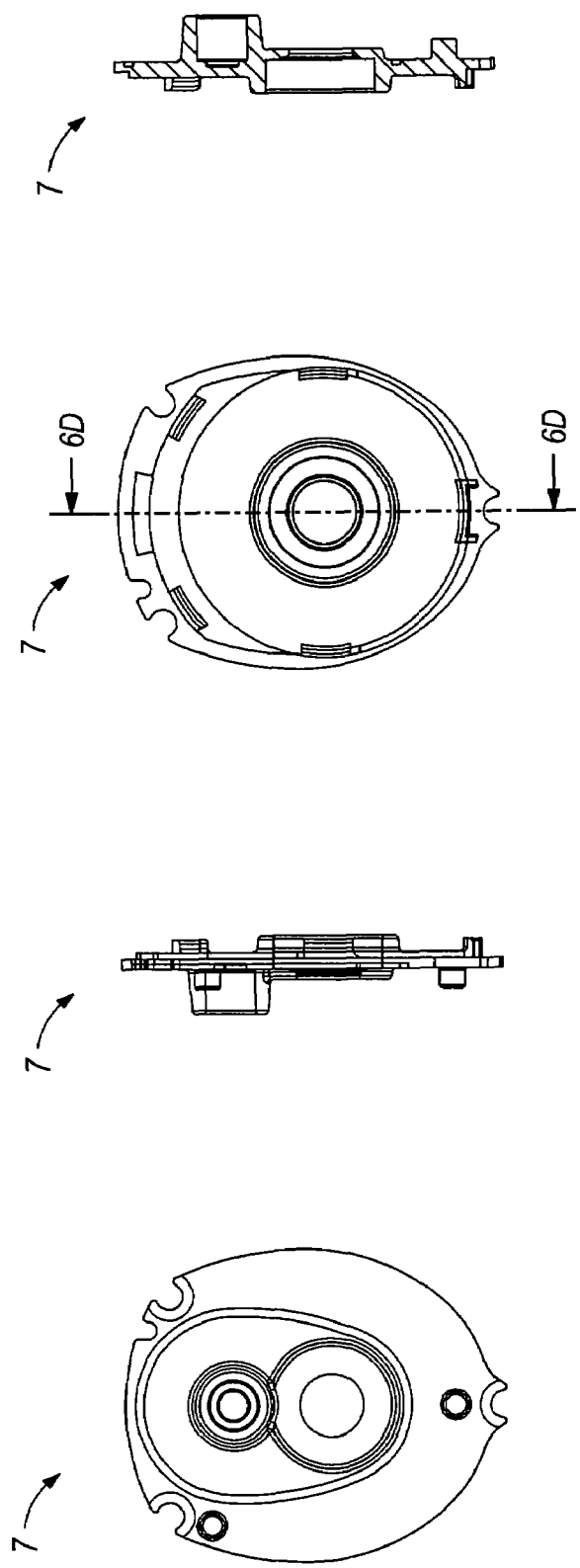
FIG. 6A is a front view of a diaphragm of the power tool shown in FIG. 1A.
FIG. 6B is a side view of the diaphragm shown in FIG. 6A.
FIG. 6C is a rear view of the diaphragm of the power tool shown in FIG. 6A.
FIG. 6D is a cross-sectional view of the diaphragm of the power tool shown in FIG. 6A.
Figure 7B:
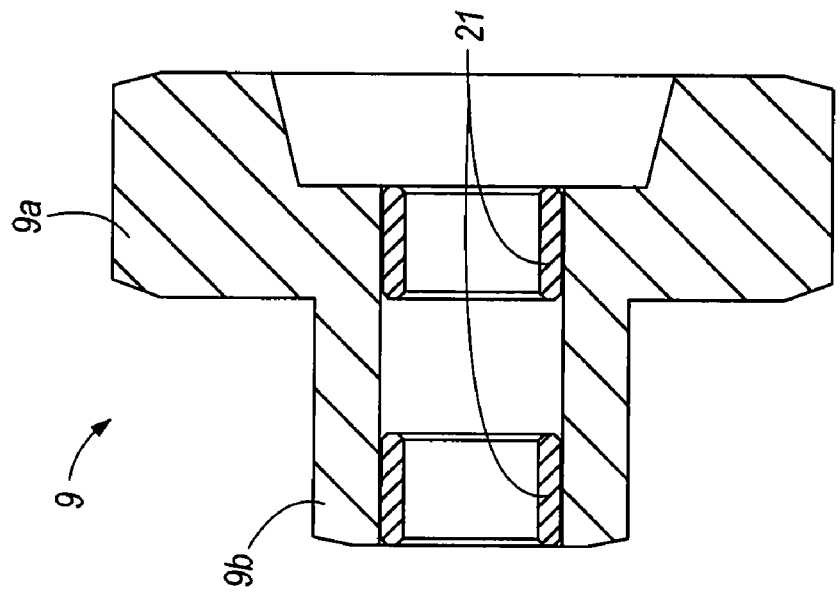
FIG. 7B is a cross-sectional view of the gear shown in FIG. 7A.
Figure 7A:
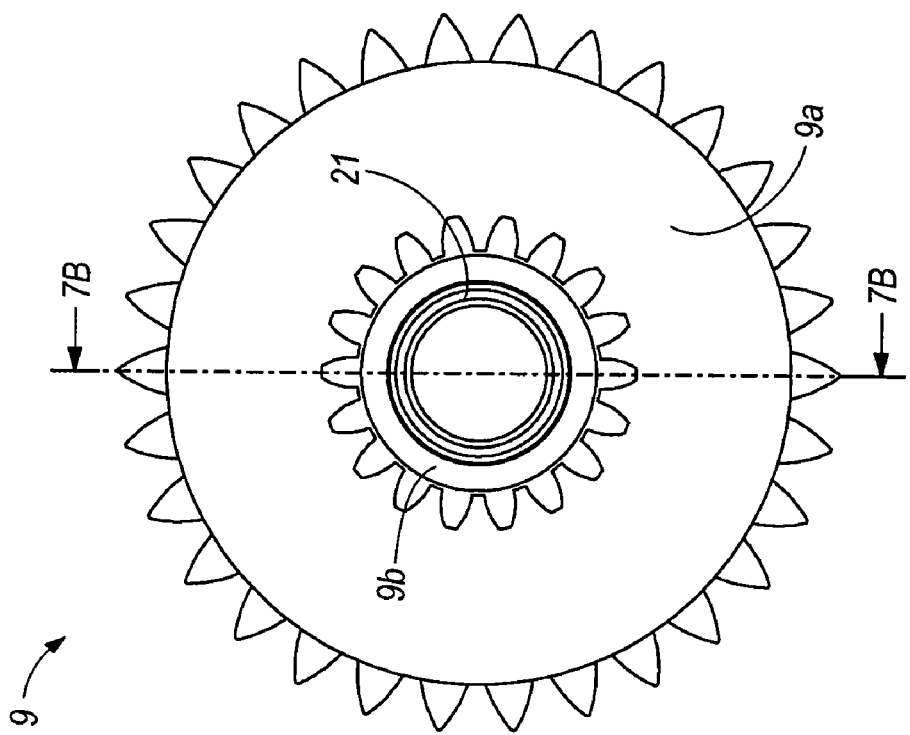
FIG. 7A is a front view of a gear of the power tool shown in FIG. 1A.
Figure 8B:
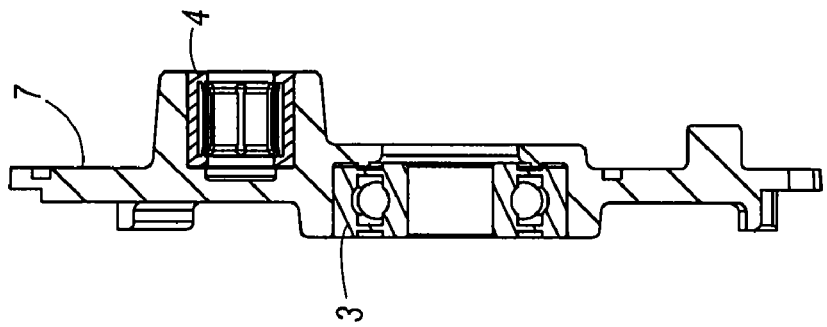
FIG. 8B is an enlarged cross-sectional view of the diaphragm shown in FIG. 6A.
Figure 8A:
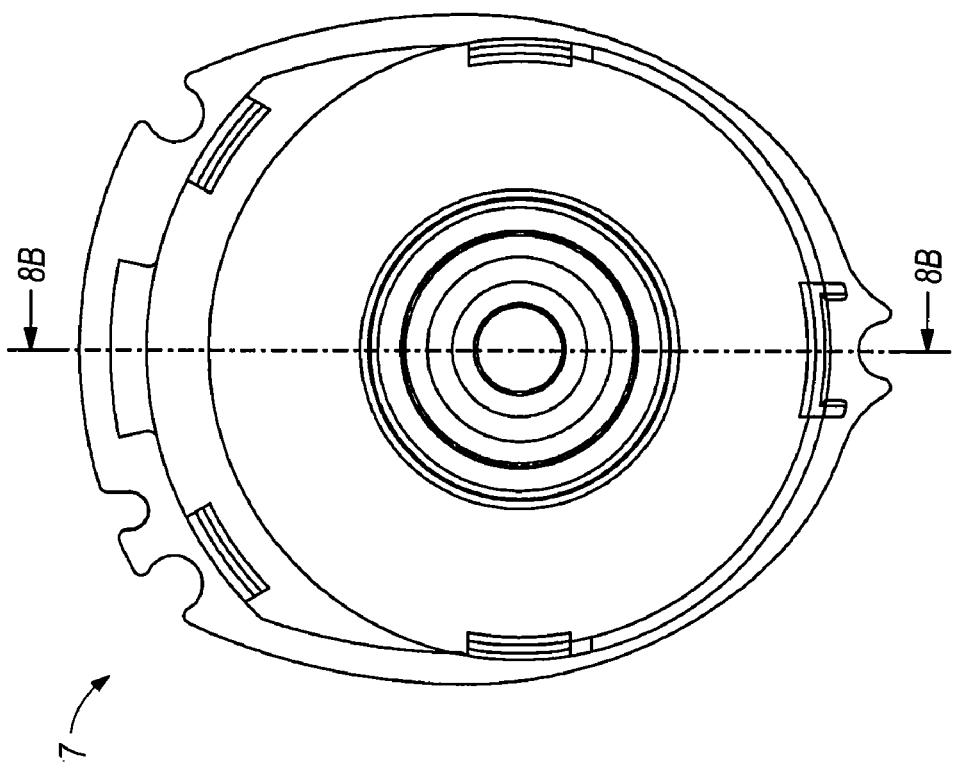
FIG. 8A is an enlarged rear view of the diaphragm shown in FIG. 6A.
Figure 9:
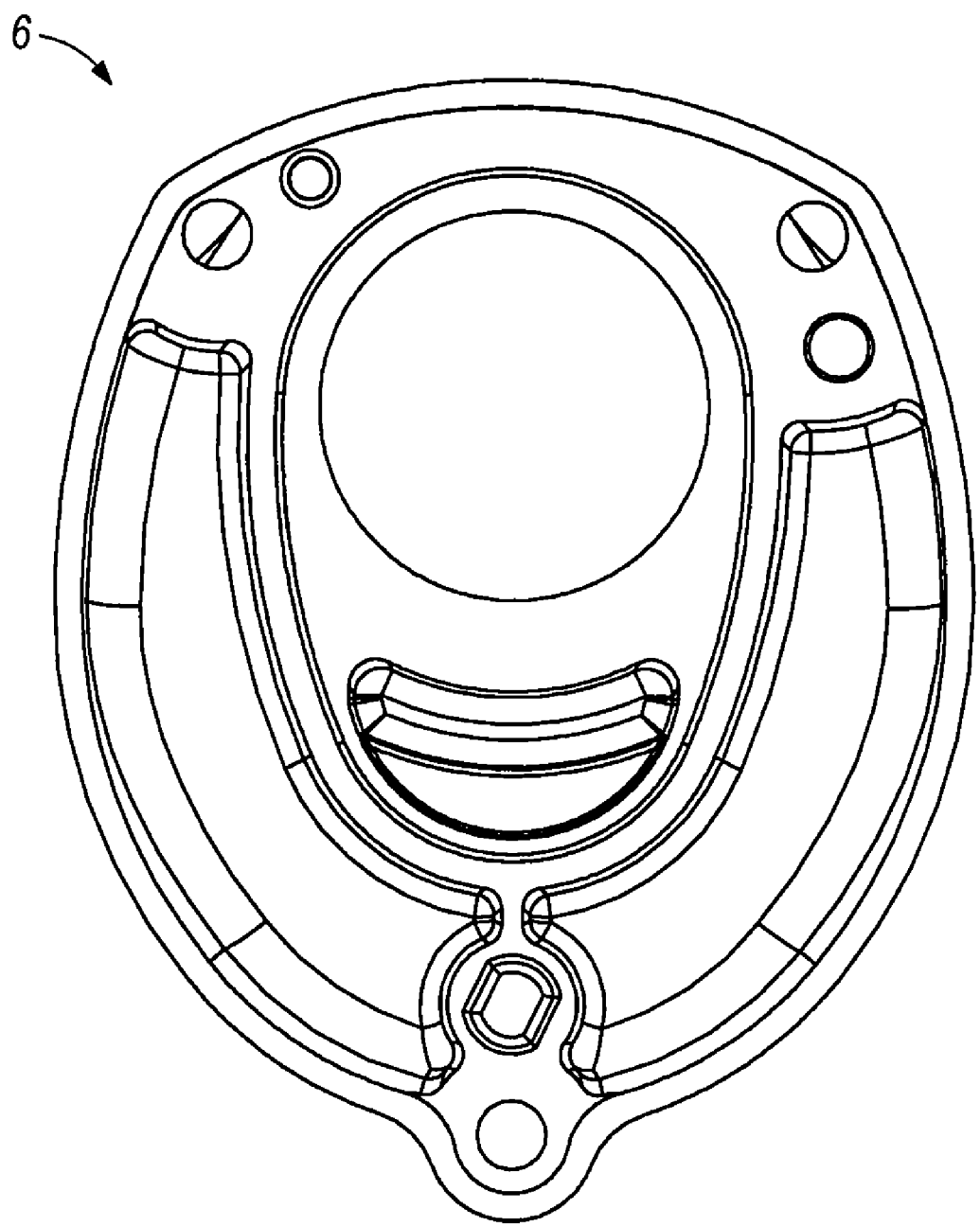
FIG. 9 is a rear view of a portion the power tool shown in FIG. 1A.
Figure 10:
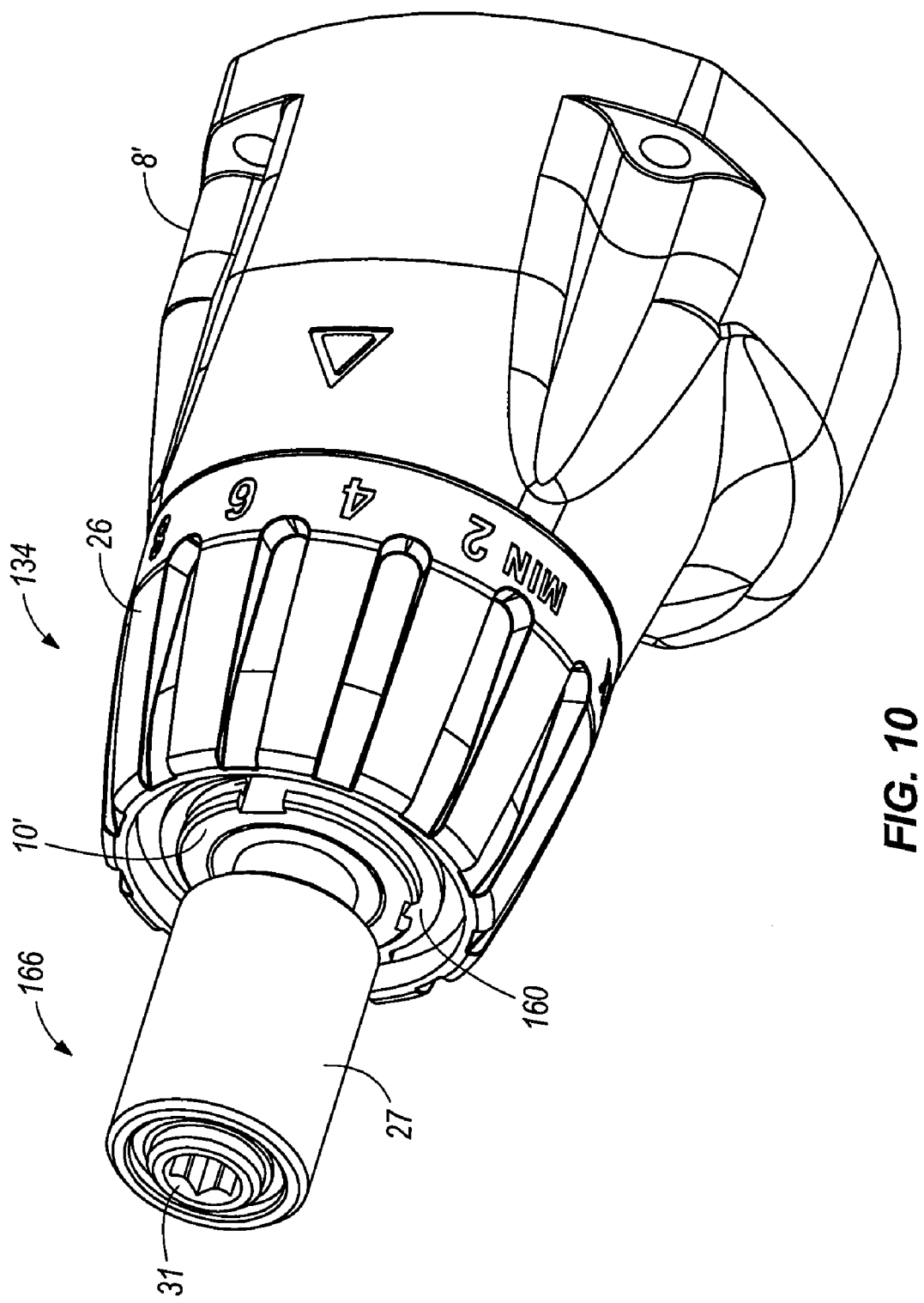
FIG. 10 is a front perspective view of an alternative embodiment of a portion of a power tool.
Figure 11:
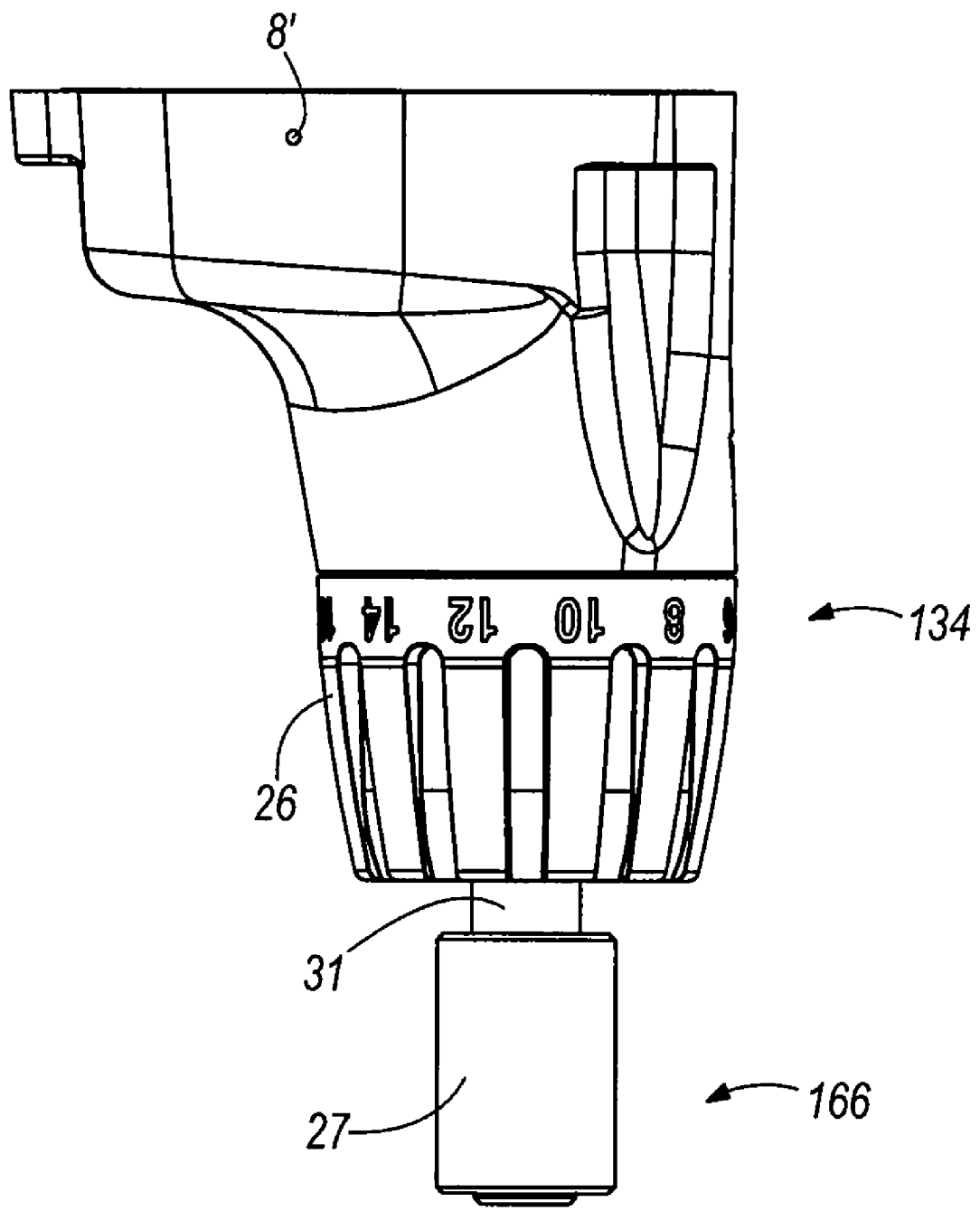
FIG. 11 is a side view of a portion of the power tool shown in FIG. 10.
Figure 12:
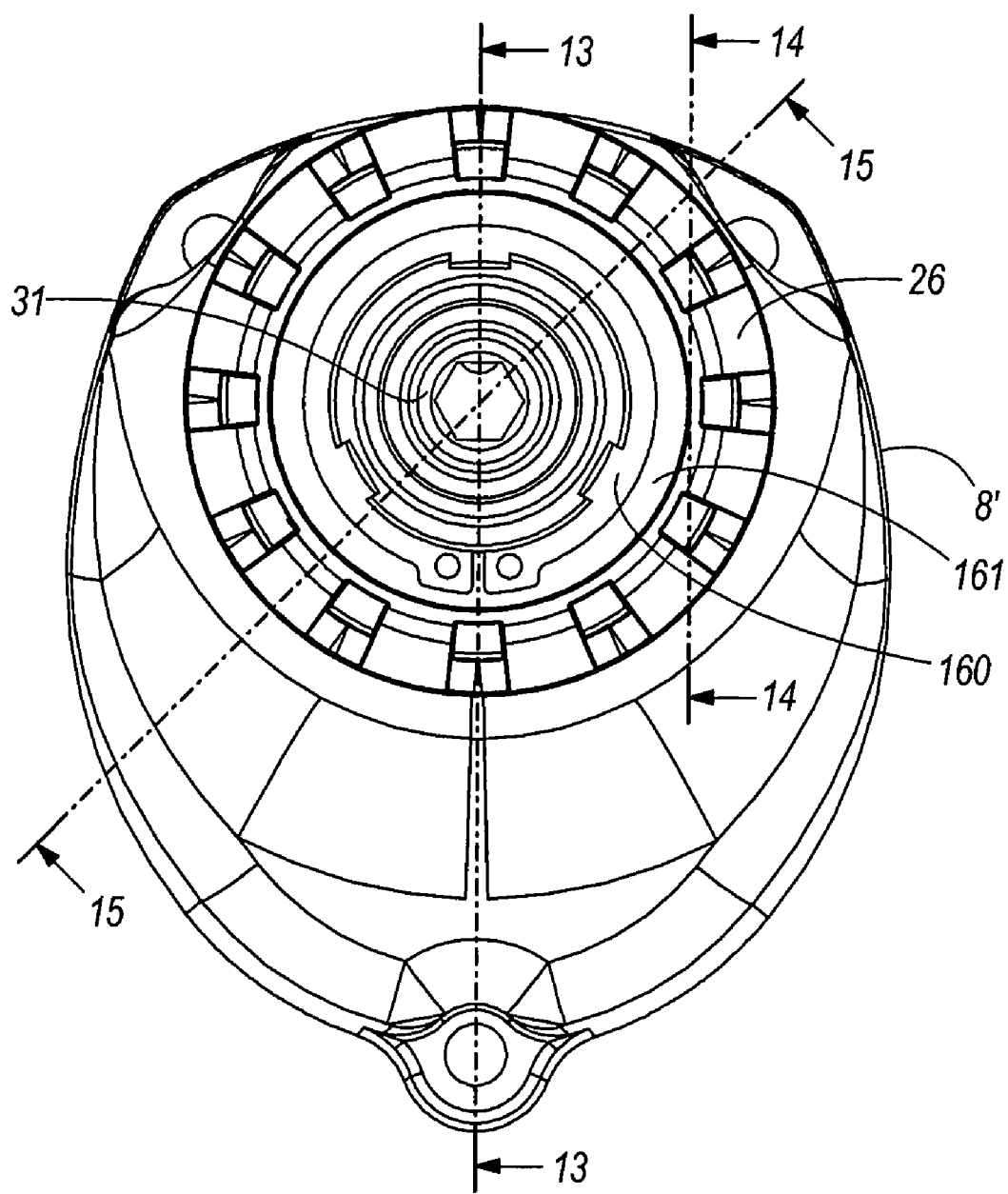
FIG. 12 is a front view of a portion of the power tool shown in FIG. 10.
Figure 13:
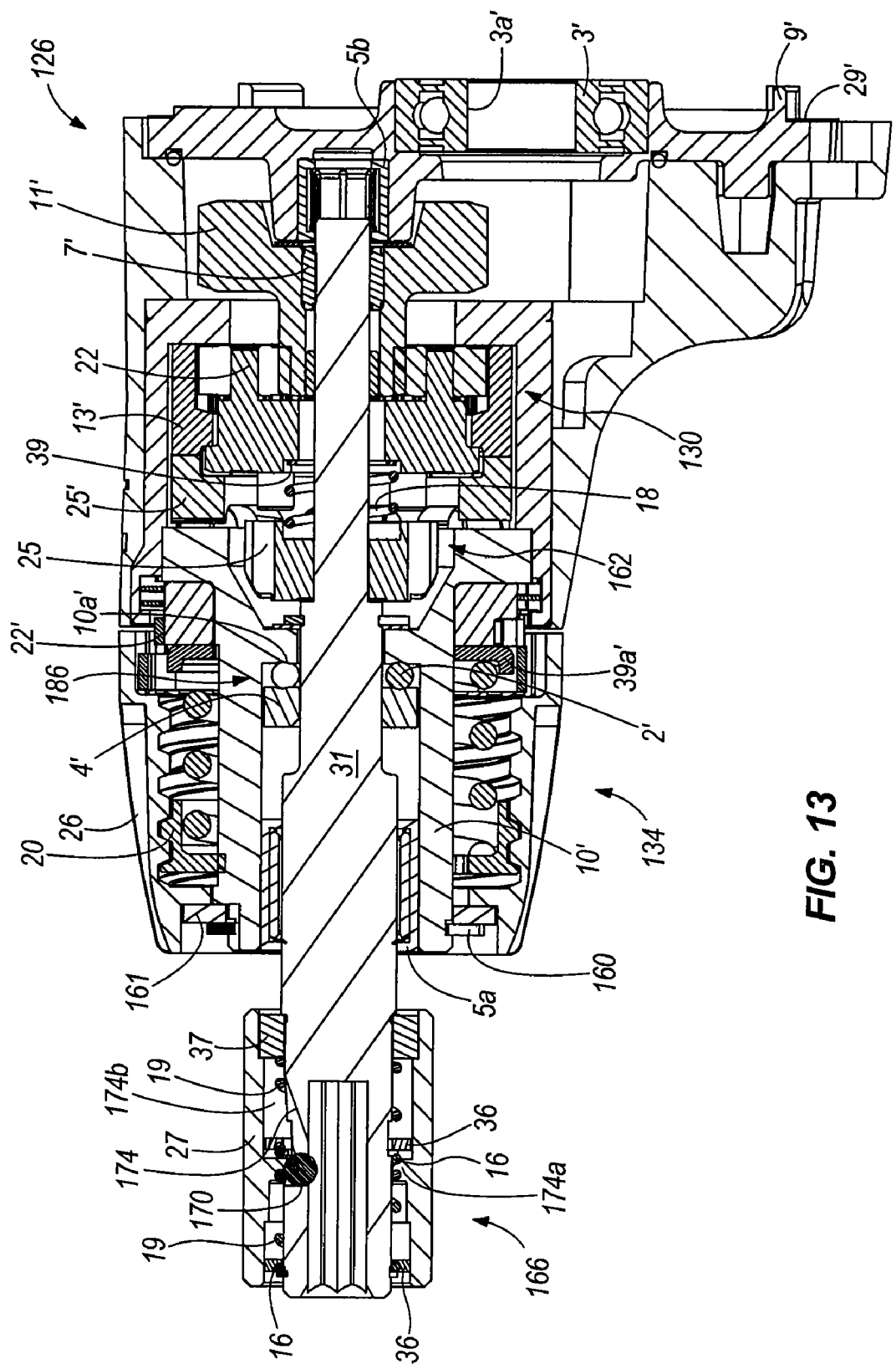
FIG. 13 is a cross-sectional side view of a portion of the power tool shown in FIG. 10.
Figure 14:
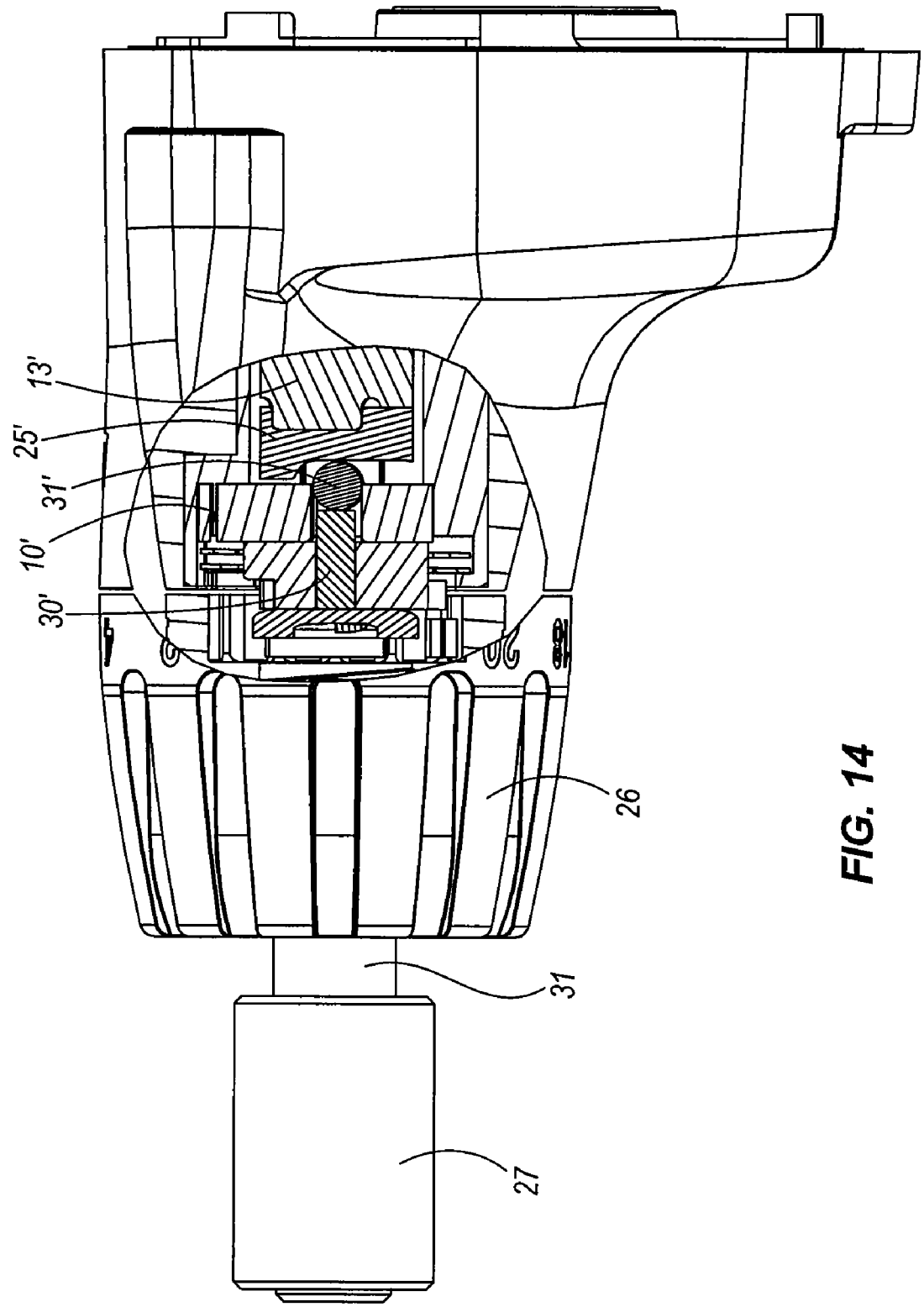
FIG. 14 is a partial cross-sectional side view of a portion of the power tool shown in FIG. 10.
Figure 15:
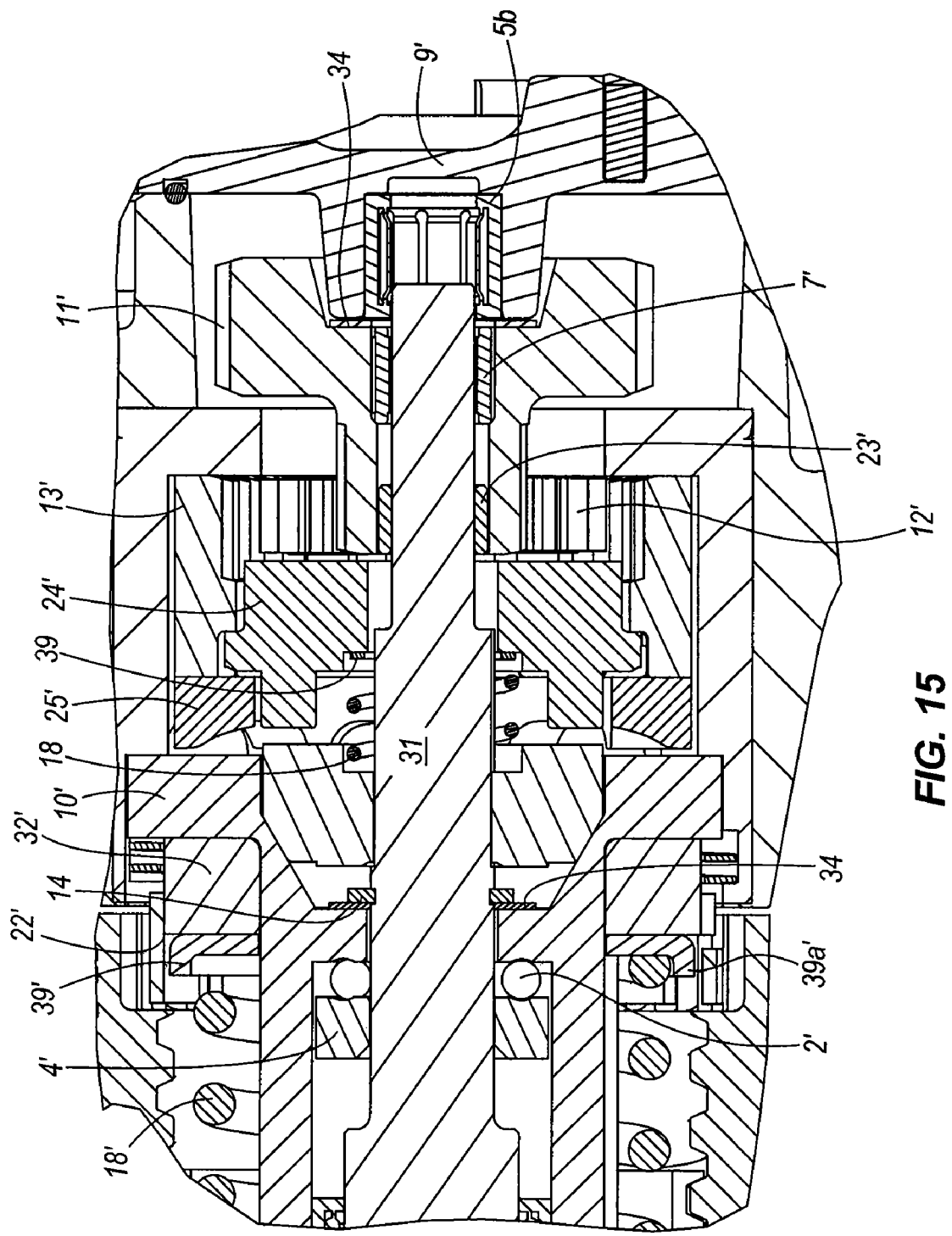
FIG. 15 is an enlarged cross-sectional side view of a portion of the power tool shown in FIG. 10.
Figure 16:
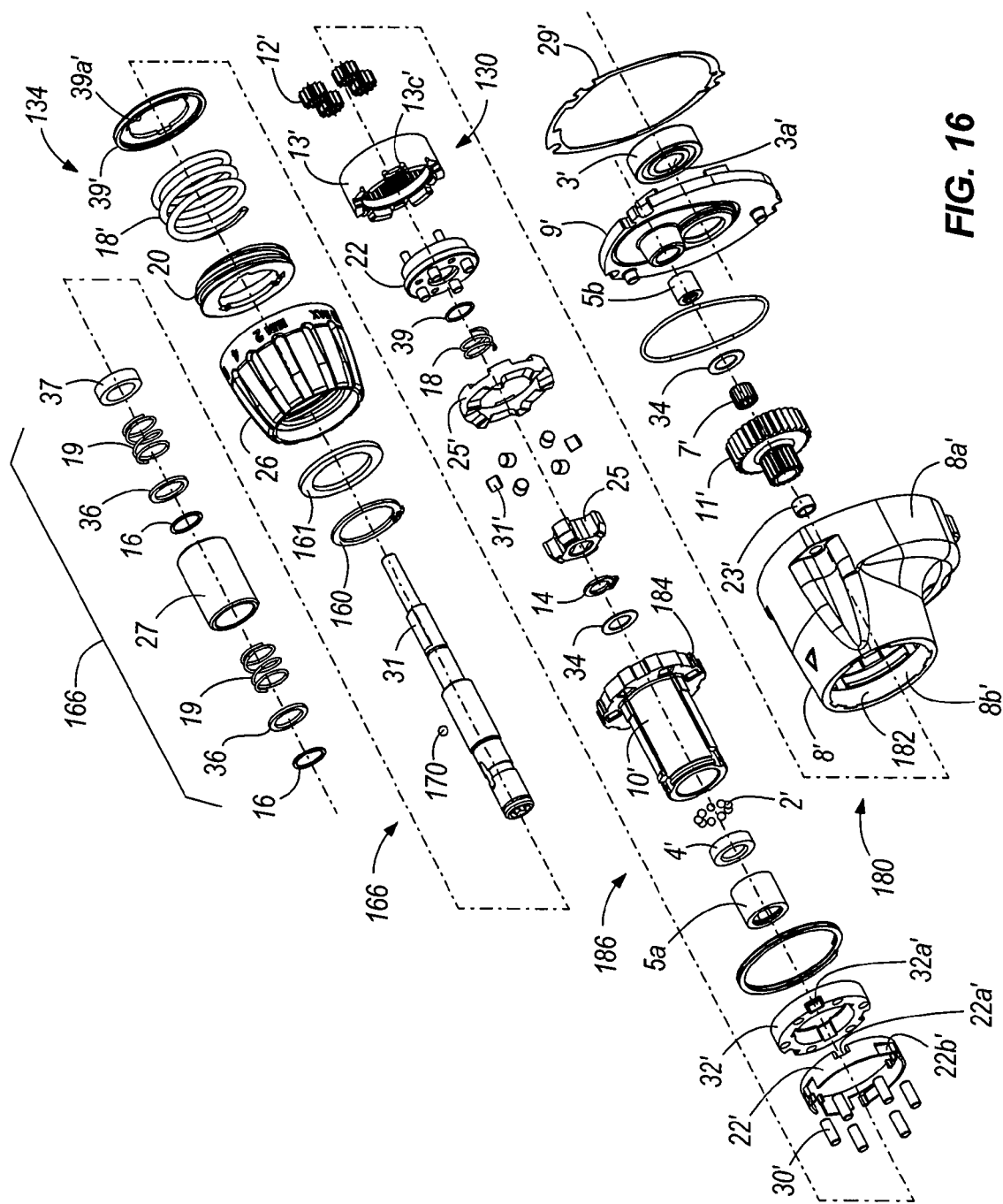
FIG. 16 is an exploded perspective view of a portion of the power tool shown in FIG. 10.
Figure 17D:
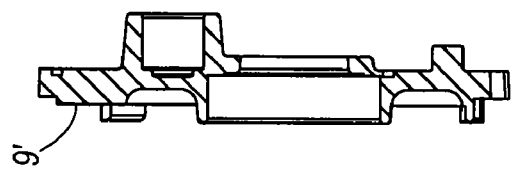
FIG. 17D is a cross-sectional view of the diaphragm shown in FIG. 17A.
Figure 17C:
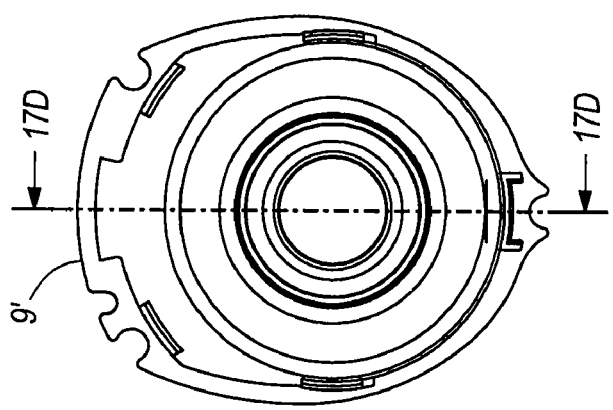
FIG. 17C is a rear view of the diaphragm shown in FIG. 17A.
Figure 17B:
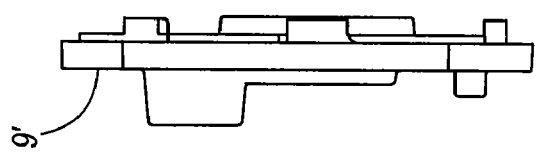
FIG. 17B is a side view of the diaphragm shown in FIG. 17A.
Figure 17A:
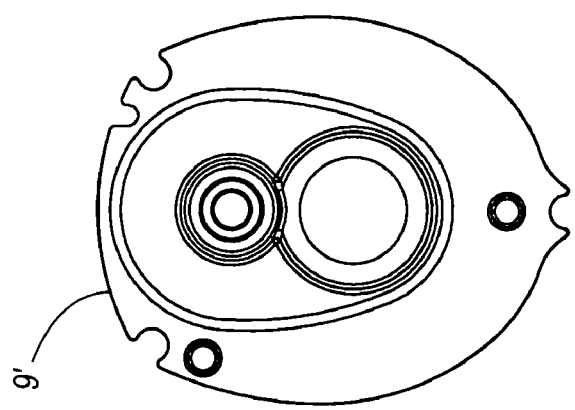
FIG. 17A is a front view of a diaphragm of the power tool shown in FIG. 10.
Figure 18B:
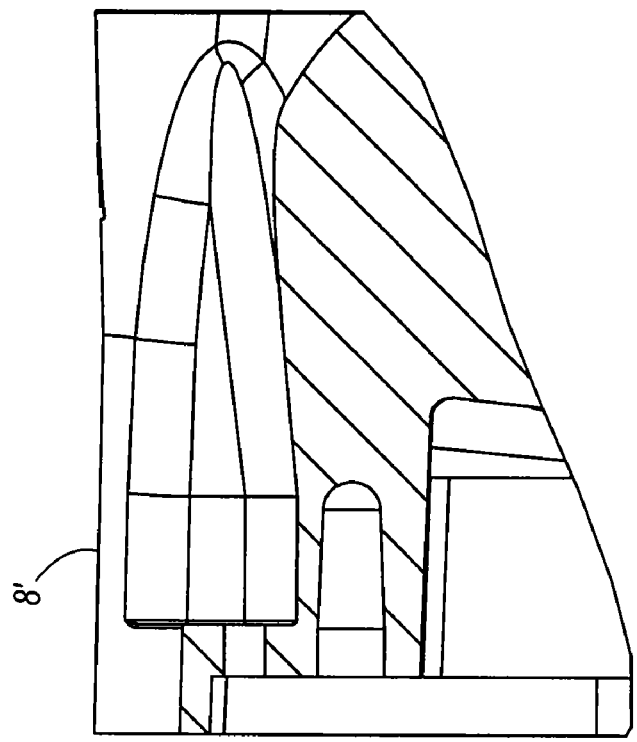
FIG. 18B is a cross-sectional view of the portion of the power tool shown in FIG. 18A.
Figure 18A:
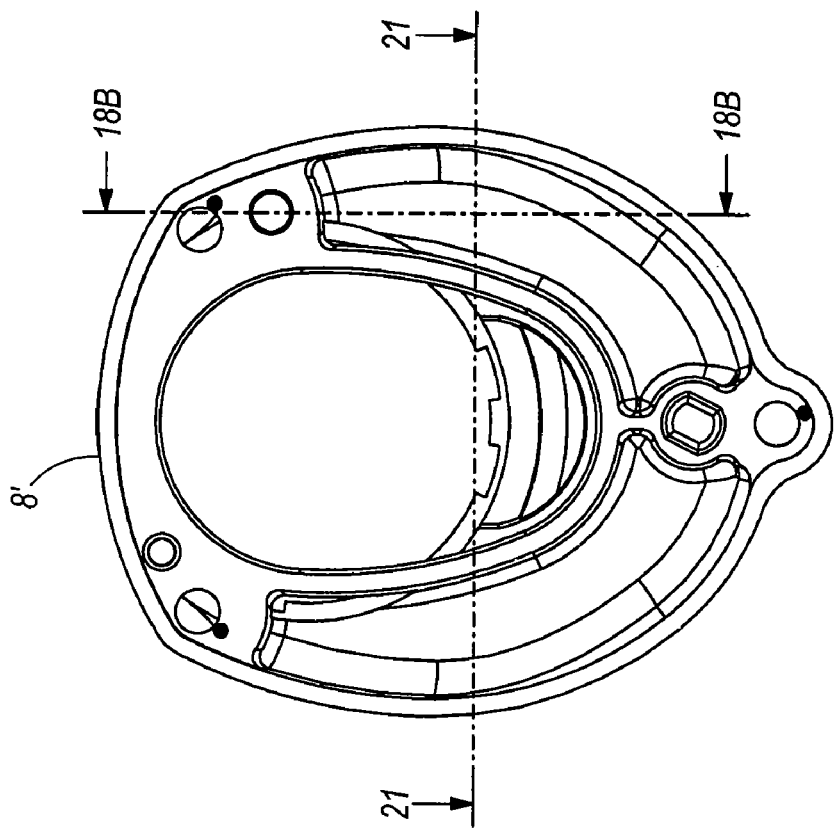
FIG. 18A is an enlarged rear view of a portion of the power tool shown in FIG. 10.
Figure 20B:
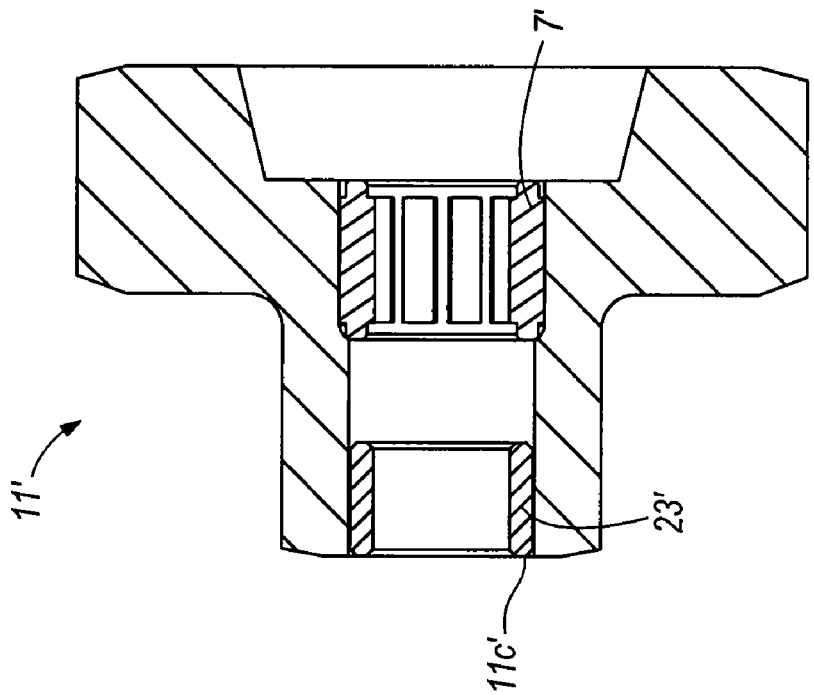
FIG. 20B is a cross-sectional view of the gear shown in FIG. 20A.
Figure 20A:
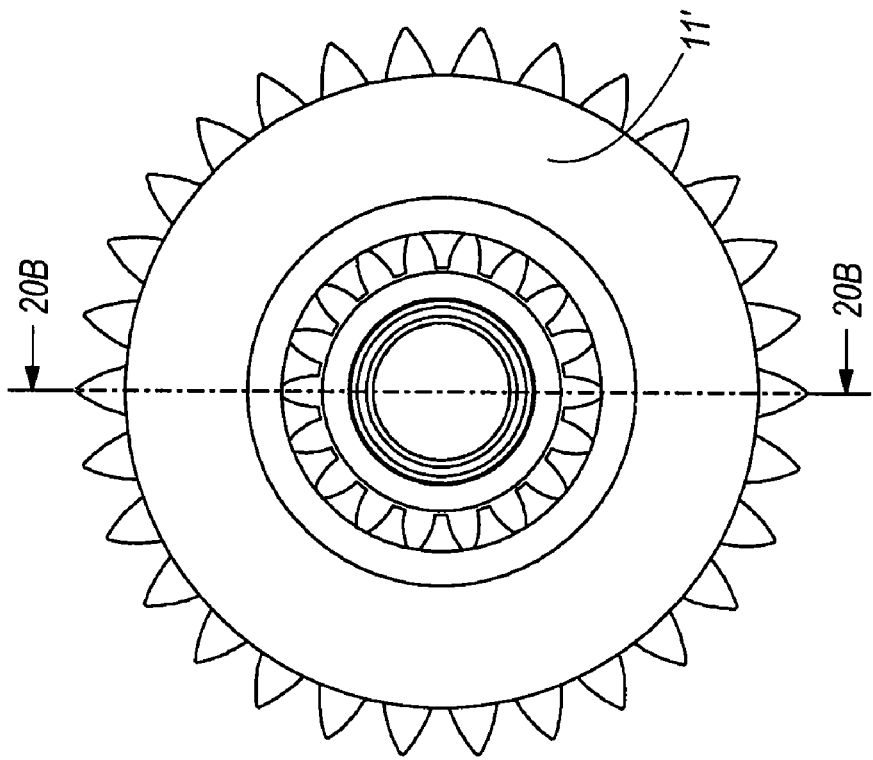
FIG. 20A is a front view of a gear of the power tool shown in FIG. 10.
Figure 21:
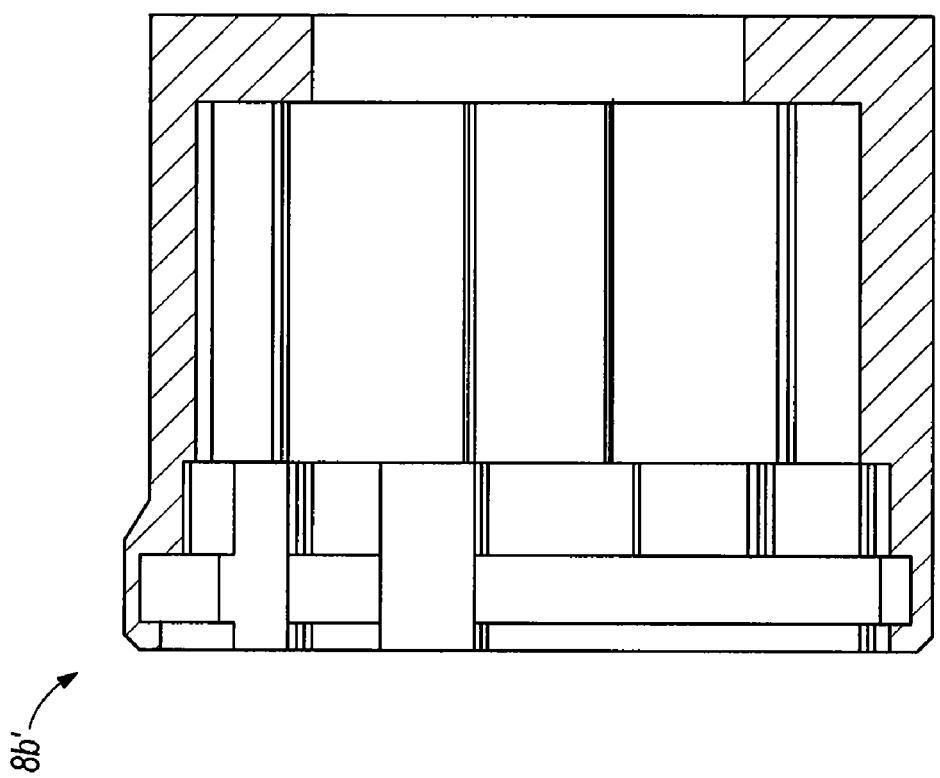
FIG. 21 is a partial cross-sectional side view of an insert for a gear case assembly of the power tool shown in FIG. 10.

In some embodiments, the rotational axis of the output shaft 31 can be generally aligned with the rotational axis of the sun gear 9 and the idler clutch plate 22 and can be offset from the rotational axis of the drive gear 12. As such, the rotational axis of the output shaft 31 can be positioned closer to the outer wall of the gear case 6 to allow clearance into relatively tighter work areas. In some embodiments, such an offset can be provided by the dual portion sun gear 9. The output shaft 31 may guide the sun gear 9 and/or may journal the first stage driven gear. A pair of bushings 21 for the sun gear 9 can be provided as shown in FIGS. 7A and 7B. A diaphragm 7 can include a portion set into a rear portion of the sun gear 9 as shown in FIGS. 3 and 4. The diaphragm 7 can house the rear end of the output shaft 31 and the associated needle bearing 5b.

In some embodiments, the drive assembly 126 of the power tool 110 can also include a clutch assembly 134 operable to set a desired torque limit. The clutch assembly 134 may generally include a clutch ring portion 138 providing clutch lugs 142. In some embodiments, the clutch ring portion 138 can be provided by a portion 11b of the ring gear assembly 11. The ring gear assembly 11 can be provided by a gear portion 11a and the separate clutch ring portion 11b. The portion 11a and 11b can be connected, for example, by inter-engaging projections 144 (shown in FIG. 5), by welding, etc. In some embodiments, a ball assembly 2 can be provided between the gear portion 11a and the idler clutch plate 22.

In some embodiments, the ring gear assembly 11 can be a multi-piece ring gear assembly. In some such embodiments, the gear portion 11a can be formed of a relatively softer material, such as, for example, powdered metal, and the clutch ring portion 11b can be formed of a relatively harder material, such as, for example, cold forged, case-hardened 8620 steel. The separate gear portion 11a and clutch ring portion 11b may allow for optimized material and selection of the lugged surface.

The clutch ring portion 11b may align radially and axially with the gear portion 11a through the inter-engaging projections 144 and pockets 145. The clutch ring portion/gear portion interface may provide structure to transmit torque and the opportunity to densify the lugs 142 on the clutch ring portion 138 when a pocket 145 is positioned in axial alignment with a clutch lug 142. The projections 144 of the gear portion 11a may fill the corresponding pockets 145 on the clutch ring portion 138 providing alignment and/or torque transmission between the parts.

The clutch assembly 134 can also include clutch members, such as, for example, rollers 146, which are engageable with the lugged surface of the clutch ring portion 138. The rollers 146 may be supported by a roller cage assembly 154 provided by a clutch plate 23, which defines pockets or openings 23a in which the rollers 146 are supported, and a clutch housing 158, which also defines pockets or openings 158a. The clutch plate 23 can be connected to the clutch housing 158, for example, by pins 23b engaging in recesses 158b.

In some embodiments, the roller cage assembly 154 can be a multi-piece assembly. In some such embodiments, the roller cage assembly 154 can be formed by a clutch housing 158 formed of a relatively softer material, such as, for example, powdered metal, and a clutch plate portion 23 formed of a relatively harder material, such as, for example, cold-forged, case-hardened 8620 steel.

The lugs 142 may have a helicoid surface 142a which interacts with the rollers 146. The pockets 23a may provide a parallel support surface as the roller 146 moves up the helicoid surface of the lugs 142. The helicoid ramp surface 142a on the clutch lugs 142 may allow line rather than point contact with the rollers 146 which may minimize wear by distributing the ramp loading and allowing the cylindrical rollers 146 to roll up, rather than slide up the ramp surface 142a.

In some embodiments, the rollers 146 can engage recessed portions 138a on the clutch ring 138 while the clutch assembly 134 is engaged to provide driving force. In the event a torque limit is exceeded, the rollers 146 can move up the ramp surface 142a and over a raised portion 142b provided on the clutch lugs 142. This movement can disengage the clutch assembly 134 so the driving force is not transmitted.

In some embodiments, the ramp surfaces 142a can have a helicoid or concavely curved cross-section with a generally increasing incline. Also, each roller 146 can have a central axis which generally extends in a radial direction. The cylindrical rollers 146 can provide contact substantially along a line with the clutch face of the clutch ring portion 138. The cylindrical rollers 146 generally correspond to the curved helicoidal shape of the ramp surfaces 142a to provide line contact during movement of the rollers 146 on the clutch lugs 142. In addition, the rollers 146 can roll rather than slide along the surface of the clutch ring portion 138.

Axial pins 150 apply the axial torque limit force to the rollers 146. The pins 150 can be supported by a clutch pin plate 30 connected to the clutch housing 158 and extend through the openings 158a in the clutch housing 158 to engage the rollers 146.

A torque adjusting spring 17 may apply the axial torque limit force to the pins 150 and rollers 146 through a notched washer 38. An adjusting collar 26 can be supported and can be threadedly engaged with a threaded ring portion 20 on the clutch housing 158. The threaded ring portion 20 can be axially movable under rotation of the adjusting collar 26 to set the torque limit force applied by the spring 17 to the rollers 146/clutch ring portion 138. A retaining ring 160 and a collar washer 161 axially locate the adjusting collar 26 and the clutch housing 158 relative to one another.

The adjusting collar 26 may be held in a rotated position corresponding to a desired torque limit setting. In some embodiments, a detent arrangement can be provided between the adjusting collar 26 and the clutch pin plate 30. Balls 1 can be supported in ball pockets 30a formed on the pin plate 30. The balls 1 can engage in detents or recesses 26a formed on the adjusting collar 26.

The ball pockets 30a and/or the adjusting collar 26 can be flexible to allow the balls 1 to disengage from the detents 26a to allow adjustment of the adjusting collar 26. The ball pockets 30a and/or the adjusting collar 26 can be resilient to releasably hold the balls 1 in the detents 26a to releasably hold the adjusting collar 26 in the desired torque limit setting position.

In the illustrated embodiment, the power tool 110 may also include a drive clutch assembly 162 for selectively transmitting driving force from the gear assembly 130 to the spindle or output shaft 31. The drive clutch assembly 162 can have a first condition, in which drive force is transmitted from the gear assembly 130 to the output shaft 31 to drive the output shaft 31, and a neutral or non-drive condition, in which driving force is not transmitted from the gear assembly 130 to the output shaft 31. In some embodiments, a portion of the drive clutch assembly 162 can be provided by the idler clutch plate 22. The drive clutch assembly 162 may allow the output shaft 31 to not be rotatably driven until the bit or a fastener is engaged against a work piece with an axial force (i.e., along the output shaft axis).

In some embodiments, the drive clutch assembly 162 can generally include a drive clutch member 25 keyed to the output shaft 31 and defining recesses or slots 25a. The drive pins 22b supported on the idler clutch plate 22 can be selectively received in the slots 25a to selectively transmit rotation of the idler clutch plate 22 to the drive clutch member 25 and to the output shaft 31. A separator spring 18 can be positioned between the drive clutch 25 and the idler clutch plate 22. The separator spring 18 can bias the drive clutch 25 and the idler clutch plate 22 axially away from one another toward the non-drive position, in which the drive pins 22b are disengaged from the slots 25a such that the idler clutch plate 22 does not drive the drive clutch member 25 and the output shaft 31. A clutch spring washer 39 can be provided adjacent the separator spring 18, providing a support surface for the separator spring 18.

The drive clutch member 25 may be prevented from rotating in the forward, neutral, non-driving position by a conical seat which mates with a cone shape on the outer diameter of the drive clutch member 25. Radial freedom of the drive clutch member 25 may provide improved alignment of the conical surfaces. These surfaces may provide a relatively high resistive torque with the application of only a relatively light axial force.

In some embodiments, the power tool 110 may also generally include a tool element or bit holder assembly 166 supported on the output shaft 31. The bit holder assembly 166 can be operable to releasably connect a tool element, such as a bit, to the output shaft 31.

In some embodiments, the bit holder assembly 166 can include a projection, such as a ball 170, which is selectively engageable with a recessed portion defined on the bit. A sleeve 27 can be operable to cause and/or allow movement of the ball 170 between a locking position, in which the ball 170 engages the recessed portion on the bit to hold the bit in the bit holder assembly 166, and a release position, in which the ball 170 is caused and/or allowed to disengage from the recessed portion on the bit to allow the bit to be removed from the bit holder assembly 166.

The output shaft 31 can include an inclined or ramped portion 174 to guide the ball 170 and allow the ball to engage the bit. The sleeve 27 can include a radially inward lock portion 174a, which is engageable with the ball 170 to force the ball 170 to the locking position, and a radially outward release portion 174b which is alignable with the ball 170 to allow the ball 170 to move radially outwardly to disengage from the recessed portion of the bit. In some embodiments, the sleeve 27 is axially slidable between the locking position and the release position. In some embodiments, the sleeve 27 can be moved forwardly from the locking position to the release position.

A spring 19 can be provided to bias the sleeve 27 rearwardly to the locking position. A retaining ring 16 and a washer 36 may retain the spring 19 and transmit the force of the spring 19 to the sleeve 27. A collar guide washer 37 can be positioned at the rearward portion of the sleeve 27, between the sleeve 27 and the output shaft 31 and may provide a rearward-most support surface for the rearward spring 19.

In operation of the power tool, when the motor 118 is driven, the drive gear 12 can engage the outer gear 9a to rotatably drive the sun gear 9. The inner gear 9b can rotatably drive the planet gears 10, and interaction with the stationary gear portion 11a of the ring gear assembly 11 causing the planet gears 10 to revolve around the sun gear 9. The planet gears 10 can rotatably drive the idler clutch plate 22.

To engage the drive clutch assembly 162, the bit can be pressed against a work piece or other resistive surface, and the bit holder assembly 166 and output shaft 31 can be moved rearwardly, against the bias of the separator spring 18. The drive clutch member 25 can move rearwardly with the output shaft 31 to permit the drive pins 22b to engage in the slots 25a. With the drive pins 22b engaged in the slots 25a, rotation of the idler clutch plate 22 can be transmitted to the drive clutch member 25 and to the spindle 31.

In contrast, with the drive clutch member 25 and the output shaft 31 in the forward, neutral, non-driving position, the idler clutch plate 22 may be driven by the motor 118 without transmitting driving force to the output shaft 31. In this neutral position, a fastener can be connected to the stationary bit and then pressed against a workpiece at which time driving force can be transmitted from the motor 118 through the idler clutch plate 22 and through the drive clutch member 25 to the output shaft 31 and bit.

Engagement of the clutch assembly 134 (with the rollers 146 engaged with the clutch ring portion 138) can maintain the ring gear assembly 11 in a stationary non-rotating position. If the torque limit applied by the clutch assembly 134 is exceeded, the rollers 146 can roll up the clutch lugs 142 to allow the ring gear assembly 11 to rotate. Rotation of the ring gear assembly 11 can limit the transmission of driving force from the motor 118 through the gear assembly 130 to the output shaft 31.

FIGS. 12-23 another embodiment of a portion of a power tool, such as a drill, a screwdriver, etc. 110'. Common elements have the same reference number. Some of the elements are identified by reference numbers including "'", which identify elements that are different than elements having the same reference number.

In some embodiments, a locking arrangement 180 may be provided between the gear case 8' and the clutch housing 10'. The gear case 8' may be formed of a case portion 8a' formed of, for example, magnesium, and an insert portion 8b' formed of, for example, powered metal. The insert portion 8b' may provide locking features 182 for engaging with features 184 on the clutch housing 10'. In some embodiments, a portion of the case portion 8a' may radially surround the insert portion 8b' to provide added strength in the radial direction. In some embodiments, the insert portion 8b' may be molded into the case portion 8a'.

In some embodiments, a drive gear (not shown but similar to the drive gear 12 described above) may be formed on the motor armature shaft, and a bearing 3' for supporting the armature shaft may have an opening 3a' with an inner diameter sufficient to allow the drive gear on the armature shaft to pass through the bearing. In such embodiments, the drive gear may be assembled to the armature shaft before the armature shaft is inserted through the armature shaft bearing 3'. In such embodiments, the motor assembly (including the drive gear) may be assembled to the drive assembly after the drive assembly 126 is assembled, In some embodiments, a diaphragm 9' may be provided between the gear case 8' and a baffle (not shown) formed on the motor housing (not shown). The motor housing may be formed of, for example, a plastic material, and the diaphragm 9' may be formed of, for example, magnesium to provide reduced weight and/or improved casting of a relatively intricate part. A wear plate 29' may be provided between the diaphragm 9' and the motor housing baffle. The wear plate 29' may be formed of, for example, spring steel, and may have a relatively low coefficient of friction which may reduce wear and/or increase the life of the diaphragm 9'.

In some embodiments, a caged roller 7' may be provided to support an end of the sun gear 11'. The caged roller 7' may accommodate an increased load on the power tool with reduced wear due to torsional vibration which may be caused by the clutch assembly 134. In contrast, radial loading on the gear assembly 130 may cause another type of support, such as a bushing (not shown), to wear excessively.

In some embodiments, the sun gear 11' may be provided with (see FIG. 20B) an internal rib, ridge or reduced diameter 11c'. The rib 11c' may function to axially retain a bushing 23' supporting an end of the sun gear 11'. In such embodiments, the bushing 23' may be inserted through the rear of the sun gear 11'. Roller action between the clutch rollers 31' and clutch ring portion 25' may cause the ring gear 13' and planet gears 12' to oscillate which may cause the bushing 23' to tend to walk axially forwardly. The internal rib 11c' may prevent the bushing 23' from traveling axially forwardly in the sun gear 11'.

In some embodiments, the ring gear assembly 13' may be formed with a radius 13c' (see FIG. 16) at the lug and key interface with the clutch ring portion 25'. The radius 13c' may prevent a stress riser from forming in the powdered metal part, for example, by decreasing stress concentration at the radius corner. This allows an increased radius at the corner while allowing a mating part for the key/lug on the surface.

In some embodiments (see FIG. 13), a thrust bearing 186 may be provided in the clutch housing 10'. The thrust bearing 186 may include balls 2' supported in an annular track 10a' formed in the clutch housing 10'. The balls 2' are provided between the bushing 4' and output shaft 31 and the clutch housing 10'. With this arrangement, wear and/or damage which may be caused by oscillation in the gear assembly 130 may be reduced.

In some embodiments, the clutch housing 10' may be formed as a single piece of wrought or forged case-hardened steel. This may reduce wear caused by torsional vibration (e.g., "pounding") of the clutch assembly 134 because of the line contact between the clutch housing 10' and the rollers 31'.

In some embodiments, the adjusting collar position retention mechanism may include (see FIG. 16) an assembly of a spring collar 22' and a clutch pin plate 32' cooperating with recesses or detents formed in the adjusting collar 26. Inter-engaging fingers 22a' and recesses 32a' may fix the spring collar 22' to the clutch pin plate 32'. Spring ears 22b' on the spring collar 22' may provide projections which are engageable with detent recesses 26a on the adjusting collar 26. The spring ears 22b' can be formed as an integral part of the spring collar 22' to reduce the number of parts and the likelihood of loose pieces within the adjusting collar position retention mechanism.

In some embodiments, the clutch assembly 134 may generally include a spring 18' which applies a force through a washer 39' to the clutch rollers 31' to set the torque limit. In some embodiments, the washer 39' may have a cupped edge 39a'. The cupped edge 39a' may provide increased stiffness to the washer 39' which may reduce the wear and/or damage to the washer 39' caused by non-uniform impacting of the clutch pins 30' on the washer 39' during clutch action.

During operation, oscillation of the gear assembly 130, including the ring gear 13' and clutch plate assembly 25', may cause the rollers 31' and roller pins 30' to move axially forwardly and rearwardly at different points which may be out-of-sync. This oscillation may cause the washer 39' to flex. The cupped edge 39a' on the washer 39' improves the strength and reduces the likelihood of damage to the washer 39'. For example, during operation of the motor 118 at 2,000 RPM and with six lugs 142 and rollers 31', the washer 39' may be subjected to non-uniform impacts around its circumference at 12,000 impacts per minute.

One or more independent features and/or independent advantages will be set forth in the claims.

The invention claimed is:

1. A drive assembly for a power tool, the power tool including a housing, a motor supported by the housing and having a motor shaft, and a spindle supported by the housing for rotation about an axis, the drive assembly being provided between the spindle and the motor shaft such that the spindle is drivingly connectable to the motor shaft to drive a tool element, the drive assembly comprising:
   a drive member supported in the housing;
   a clutch member supported in the housing and being selectively engageable with the drive member to transfer a drive force from the motor shaft to the spindle when a torque exerted on the spindle is less than or equal to a torque limit and being movable away from the drive member to prevent the transfer of the drive force from the motor shaft to the spindle when the torque exerted on the spindle exceeds the torque limit;
   a first clutch plate secured to the spindle for movement with the spindle relative to the housing;
   a second clutch plate supported in the housing and being engageable with the first clutch plate to transmit the drive force from the motor shaft to the spindle when the tool element engages a workpiece; and
   a brake supported in the housing for selectively inhibiting rotation of the first clutch plate, one of the clutch plate and the brake including a conical seat and an other of the clutch plate and the brake including a mating cone that is selectively engageable with the conical seat to inhibit rotation of the first clutch plate with respect to the second clutch plate about the axis.

2. The drive assembly of claim 1, wherein the first clutch plate is moveable along the axis with respect to the housing between an engaged position, in which the first clutch plate is engageable with the second clutch plate to transmit the drive force from the motor shaft to the spindle, and a disengaged position, in which the first clutch plate is spaced apart from the second clutch plate to prevent the transmission of the drive force from the motor shaft to the spindle.

3. The drive assembly of claim 2, wherein the mating cone engages the conical seat in the disengaged position.

4. The drive assembly of claim 1, wherein the drive member includes a plurality of outwardly extending lugs, wherein the clutch member is movable along the drive member and is selectively engageable with the plurality of lugs to transfer the drive force from the motor shaft to the spindle wherein at least one of the plurality of lugs has a helicoid ramp, and wherein the clutch member is selectively engageable with the one of the plurality of lugs along a line to distribute a contact force along the line, 5. The drive assembly of claim 1, wherein the drive member includes a first gear portion formed of a first material and a second gear portion formed of a second material, the first material and the second material being different, wherein the first gear portion defines a recess, and wherein the second gear portion includes an outwardly extending protrusion engageable in the recess to selectively drivingly connect the first gear portion and the second gear portion.

6. The drive assembly of claim 1, wherein the drive member includes a plurality of outwardly extending lugs, and further comprising a cage having a first cage member and a second cage member, the clutch member being supported in the cage between the first cage member and the second cage member and being selectively engageable with the lugs of the gear member to transfer the drive force from the motor shaft to the spindle.

7. The drive assembly of claim 6, wherein the first cage member is formed of a first material and the second cage member is formed of a second material, the first material and the second material being different and wherein the first material has a greater hardness than the second material.

\* \* \* \* \*